(12) United States Patent
Boegli

(10) Patent No.: US 9,505,167 B2
(45) Date of Patent: Nov. 29, 2016

(54) DEVICE FOR EMBOSSING FOILS

(75) Inventor: Charles Boegli, Marin-Epagnier (CH)

(73) Assignee: Boegli-Gravures S.A., Marin-Epagnier (CH)

( * ) Notice: Subject to any disclaimer, the term of this patent is extended or adjusted under 35 U.S.C. 154(b) by 369 days.

(21) Appl. No.: 13/995,834

(22) PCT Filed: Dec. 22, 2011

(86) PCT No.: PCT/EP2011/073756
§ 371 (c)(1),
(2), (4) Date: Jun. 19, 2013

(87) PCT Pub. No.: WO2012/085187
PCT Pub. Date: Jun. 28, 2012

(65) Prior Publication Data
US 2013/0273322 A1    Oct. 17, 2013

(30) Foreign Application Priority Data
Dec. 23, 2010   (EP) ..................................... 10196854

(51) Int. Cl.
*B21D 13/04*  (2006.01)
*B29C 59/04*  (2006.01)
(Continued)

(52) U.S. Cl.
CPC ............. *B29C 59/046* (2013.01); *B21D 13/04* (2013.01); *B31F 1/07* (2013.01); *B44B 5/0047* (2013.01); *B21B 27/005* (2013.01); *B31F 2201/0733* (2013.01); *B31F 2201/0735* (2013.01);
(Continued)

(58) Field of Classification Search
CPC ....... B21D 13/04; B21B 27/005; B31F 1/07; B31F 2201/0741; B31F 2201/0746; B31F 2201/0751; B29C 59/04; B29C 59/046; B44B 5/0009; B44B 5/0047
See application file for complete search history.

(56) References Cited

U.S. PATENT DOCUMENTS 3,264,978 A *  8/1966  Staley ............................. 101/23
3,309,984 A *  3/1967  Mackay .................. B23P 15/40
                                                          101/23
(Continued)

FOREIGN PATENT DOCUMENTS

EP    1897682 A1 *  3/2008 ................ B31F 1/07
EP    1 925 443 A1    5/2008
(Continued)

OTHER PUBLICATIONS

European Search Report and Written Opinion; EP No. 10196854; Sep. 14, 2011; 4 pages.
(Continued)

*Primary Examiner* — Edward Tolan
(74) *Attorney, Agent, or Firm* — Foley & Lardner LLP

(57) ABSTRACT

The foil embossing device has an embossing unit (34) comprising at least two rollers (40, 41) at least one of which (40) is an embossing roller and is driven by a drive (5), at least the embossing roller having teeth (B) that project from the base cylinder for producing logos on the foil in a logo area (27) with teeth (39) that are different from the regularly arranged teeth (A) in order to produce a variable specific embossing pressure on the foil, the rollers having both axially and radially acting centering elements (4, 8) for centering the embossing roller (40) with respect to the other roller (41). It is thus possible to emboss logos in a substantially greater variety of designs and with higher accuracy than in the prior art and thus to achieve a sophisticated esthetic impression.

14 Claims, 15 Drawing Sheets

Figure 30:
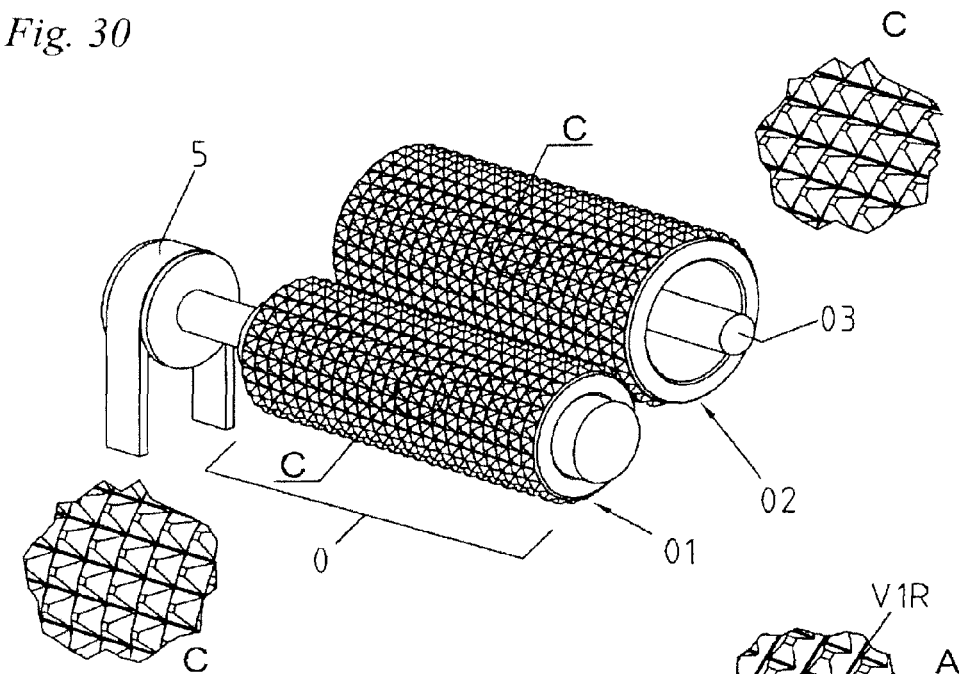

(51) Int. Cl.
*B44B 5/00* (2006.01)
*B31F 1/07* (2006.01)
*B21B 27/00* (2006.01)

(52) U.S. Cl.
CPC ...... *B31F2201/0741* (2013.01); *B31F 2201/0743* (2013.01); *B31F 2201/0746* (2013.01); *B31F 2201/0748* (2013.01); *B31F 2201/0751* (2013.01); *Y10T 428/24479* (2015.01)

(56) References Cited

U.S. PATENT DOCUMENTS

| | | | | |
|---|---|---|---|---|
| 3,598,042 A * | 8/1971 | Boyd | | 101/163 |
| 3,731,620 A * | 5/1973 | Klemmer | | B30B 3/04 100/170 |
| 3,956,915 A * | 5/1976 | Saunders | | B21B 1/227 72/198 |
| 4,343,866 A * | 8/1982 | Oser | | B21D 13/04 428/593 |
| 4,732,082 A * | 3/1988 | Ireton | | B21B 17/04 101/23 |
| 4,926,666 A * | 5/1990 | Gotting | | B41F 13/21 72/247 |
| 4,978,583 A * | 12/1990 | Wakui | | B21B 1/227 219/121.68 |
| 5,007,271 A * | 4/1991 | Boegli | | B21D 13/04 156/206 |
| 5,009,093 A * | 4/1991 | Quinn, Jr. | | B21D 53/262 72/177 |
| 5,315,790 A * | 5/1994 | Kish | | B23F 19/002 29/893.35 |
| 5,388,490 A * | 2/1995 | Buck | | B26D 7/2628 83/344 |
| 5,443,379 A * | 8/1995 | Hsu | | A21C 11/24 425/335 |
| 5,485,761 A * | 1/1996 | Rouverol | | F16H 55/08 29/893.3 |
| 5,722,319 A * | 3/1998 | Hirano | | B29C 59/02 101/23 |
| 6,176,819 B1 | 1/2001 | Boegli et al. | | |
| 6,230,578 B1 * | 5/2001 | Kim | | F16H 55/0886 74/462 |
| 7,036,347 B2 | 5/2006 | Boegli | | |
| 7,147,453 B2 | 12/2006 | Boegli | | |
| 7,229,681 B2 * | 6/2007 | Boegli | | B29C 59/022 101/23 |
| 8,347,684 B2 * | 1/2013 | Coderre | | B31F 1/07 72/184 |
| 8,468,938 B2 * | 6/2013 | Redd | | 101/24 |
| 8,495,900 B2 | 7/2013 | Boegli | | |
| 8,657,596 B2 * | 2/2014 | Lake et al. | | 425/363 |
| 2002/0069771 A1 * | 6/2002 | Pickford | | B31F 1/07 101/6 |
| 2005/0279147 A1 * | 12/2005 | Boegli | | B29C 59/04 72/196 |
| 2007/0051252 A1 * | 3/2007 | Chen | | B44B 5/0009 101/6 |
| 2008/0116610 A1 * | 5/2008 | Boegli | | 264/284 |
| 2008/0199660 A1 * | 8/2008 | Gelli | | B31F 1/07 428/172 |
| 2009/0050001 A1 | 2/2009 | Boegli | | |
| 2012/0292821 A1 | 11/2012 | Boegli | | |

FOREIGN PATENT DOCUMENTS

| | | |
|---|---|---|
| EP | 2 027 994 A2 | 2/2009 |
| EP | 2 353 858 A1 | 8/2011 |
| WO | WO-2010/010580 A2 | 1/2010 |

OTHER PUBLICATIONS

International Search Report and Written Opinion; PCT/EP2011/073756; Oct. 4, 2012; 7 pages.

* cited by examiner

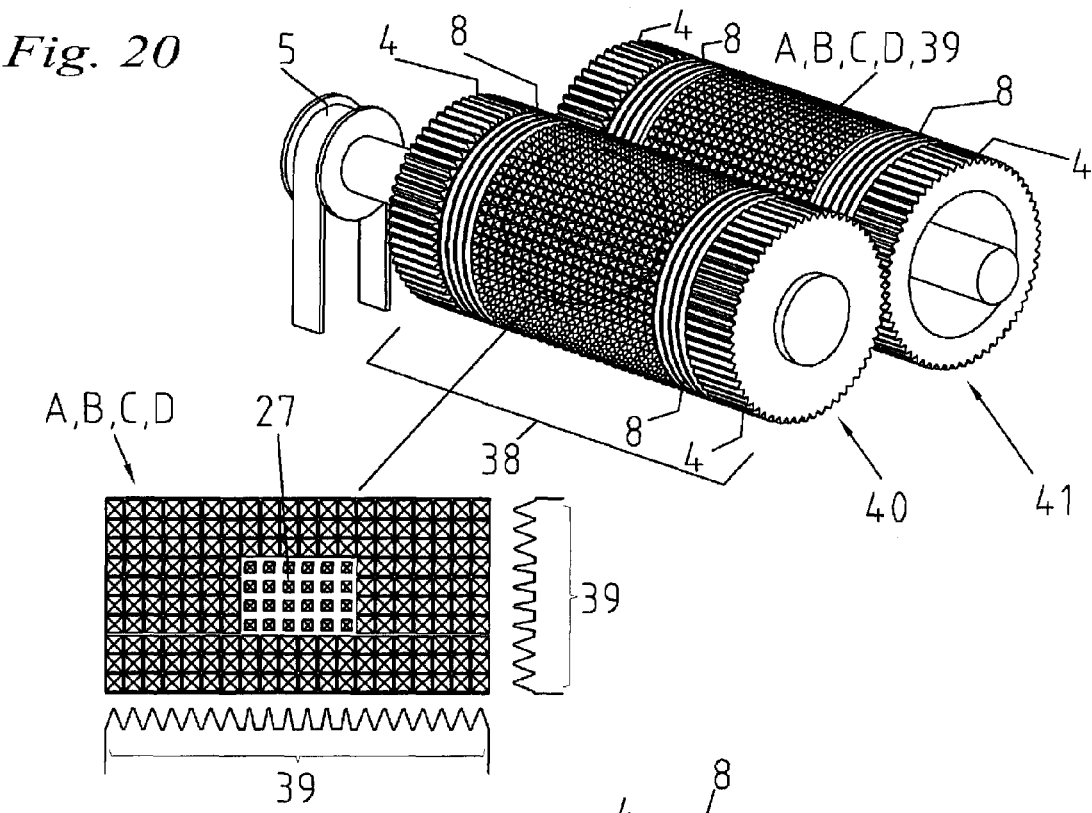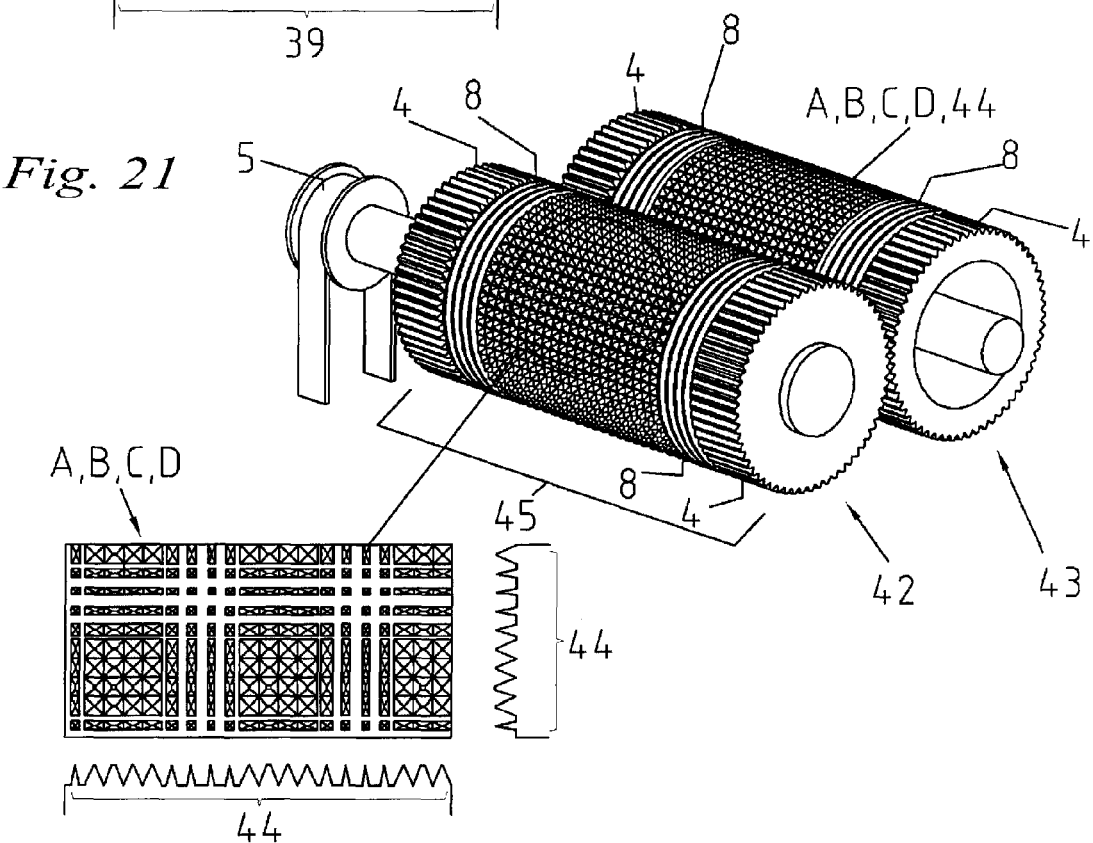

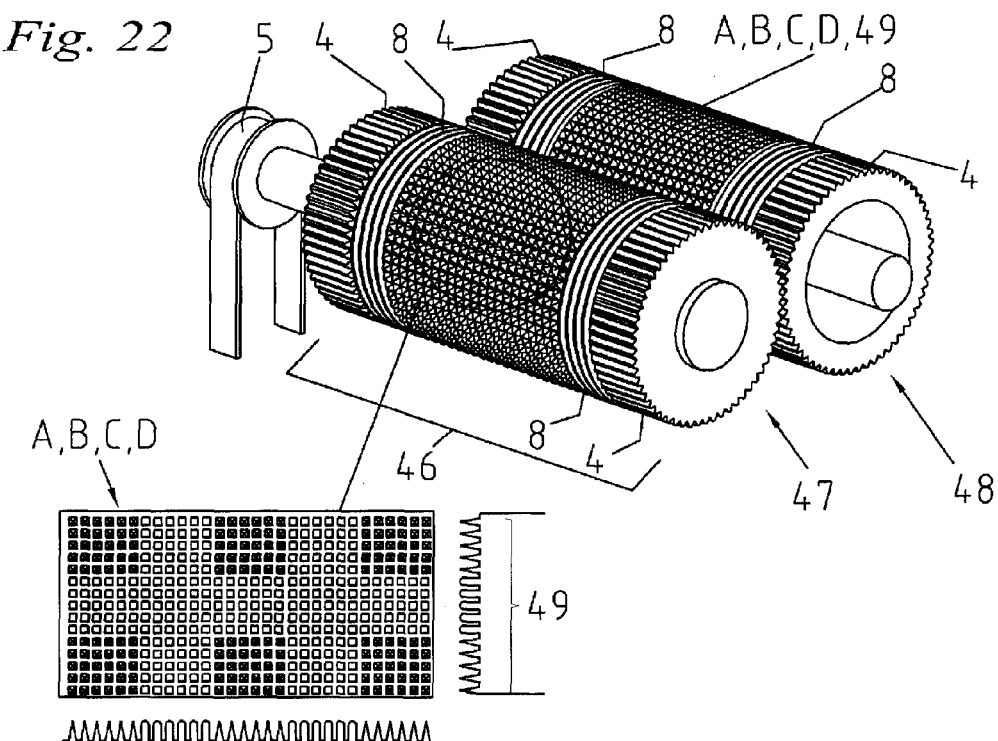
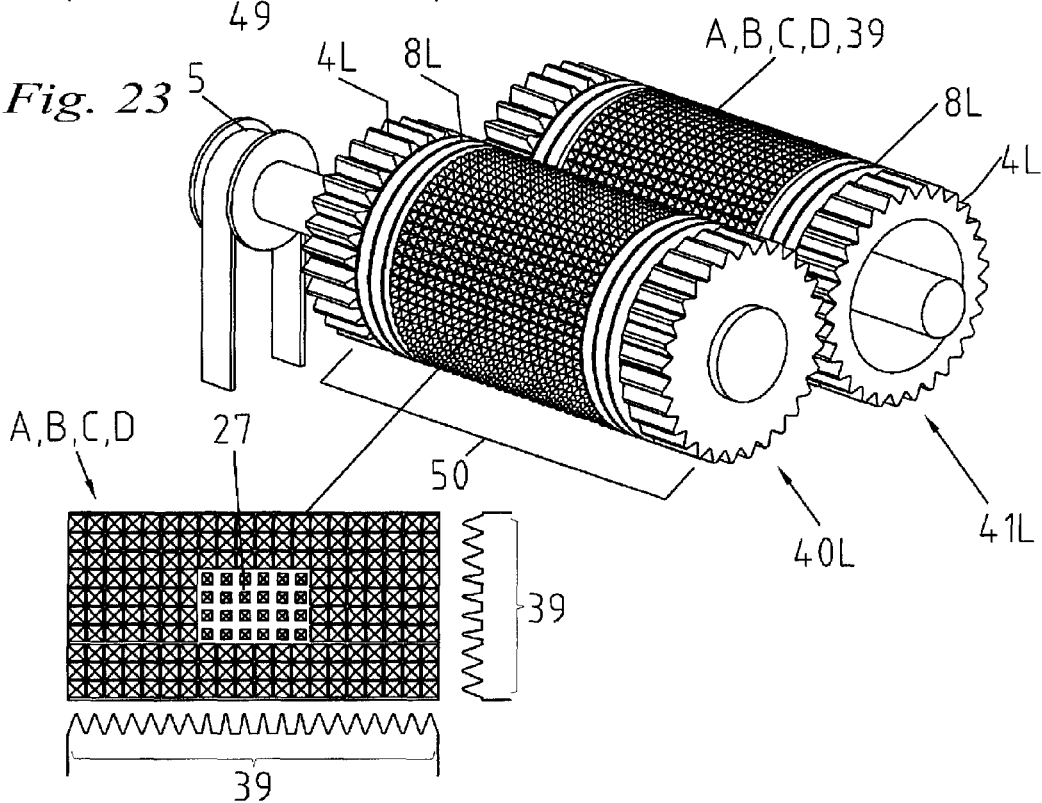

DEVICE FOR EMBOSSING FOILS

The present patent application relates to a device for embossing foils and to foils produced by means of this device.

The foils to be used may be made of paper or synthetic materials or may be hybrid foils where e.g. a sputter deposited metal layer is enclosed between synthetic and/or paper layers, or they may consist of metal or be provided with a metal layer. They may be used for so-called innerliners, for cigarette mouthpieces, or for packaging boxes or the like. Hereinafter, for the sake of simplicity, the term "foil" will be used for all these different foil types.

For embossing logos of any kind on foils according to the pinup-pinup process, i.e. by means of teeth that project from the cylinder circumference of the embossing roller and projecting teeth on the counter-roller also, there are generally two methods. In the usual method, the logos are produced by removing or modifying the involved teeth on the embossing roller while the remaining teeth serve for satinizing. In a second production process, teeth are only provided on the embossing roller in those locations where the logos are to be produced. In the remaining areas, teeth may be provided which serve for driving the rollers and for their stability.

Both methods have in common that particularly in the case of larger areas without teeth, the foil will not be uniformly embossed over its entire width as the pressure applied to the foil is not the same whether teeth are interlocking or teeth of one roller face empty areas on the other roller.

Moreover, with regard to embossing techniques, there is a trend towards ever finer teeth and structures. Whereas a tooth spacing or pitch of 0.3 mm was a general standard, spacings down to 0.10 mm have currently become usual. More recent embossing techniques also allow embossing in few locations only while the remaining areas of the roller are so designed that the foil remains unembossed.

In addition to the production of logos by omitting teeth or by providing teeth in the corresponding locations only, or by so-called shadow embossing where logos are produced by modified teeth, manufacturers constantly aim to produce logos having still other structures and/or an increased brilliance.

Accordingly, it is the object of the present invention to provide an embossing device that allows embossing logos or entire foils with a wider range of design possibilities and with substantially increased precision. Such a device is described in the embodiments below.

The invention will be explained in more detail hereinafter with reference to drawings of exemplary embodiments, all Figures being schematic and some of them perspective views.

Figure 1:
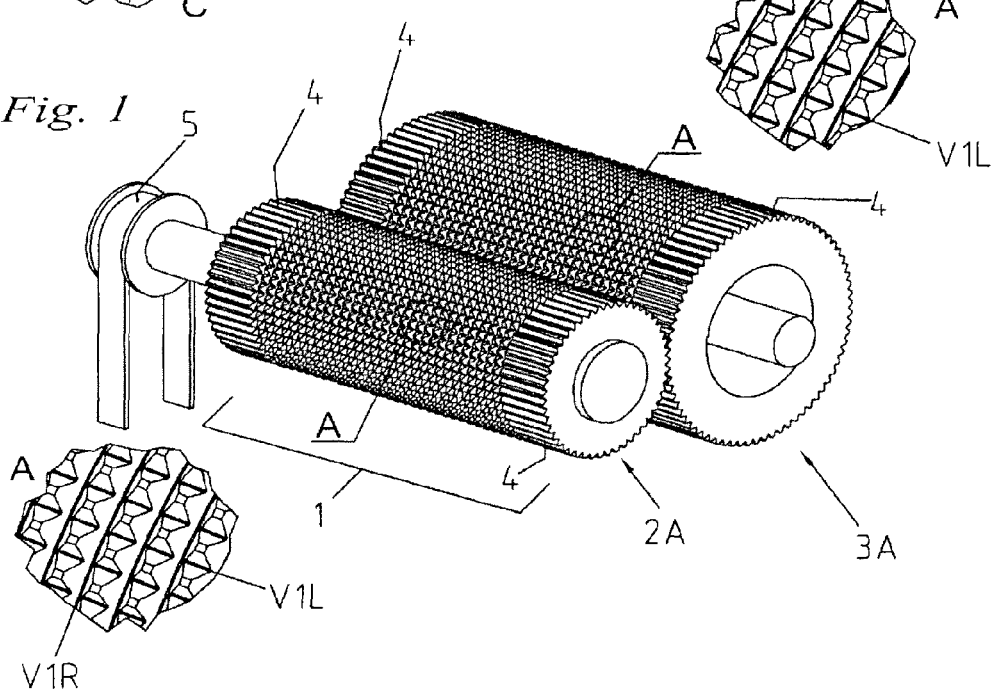
Figure 2:
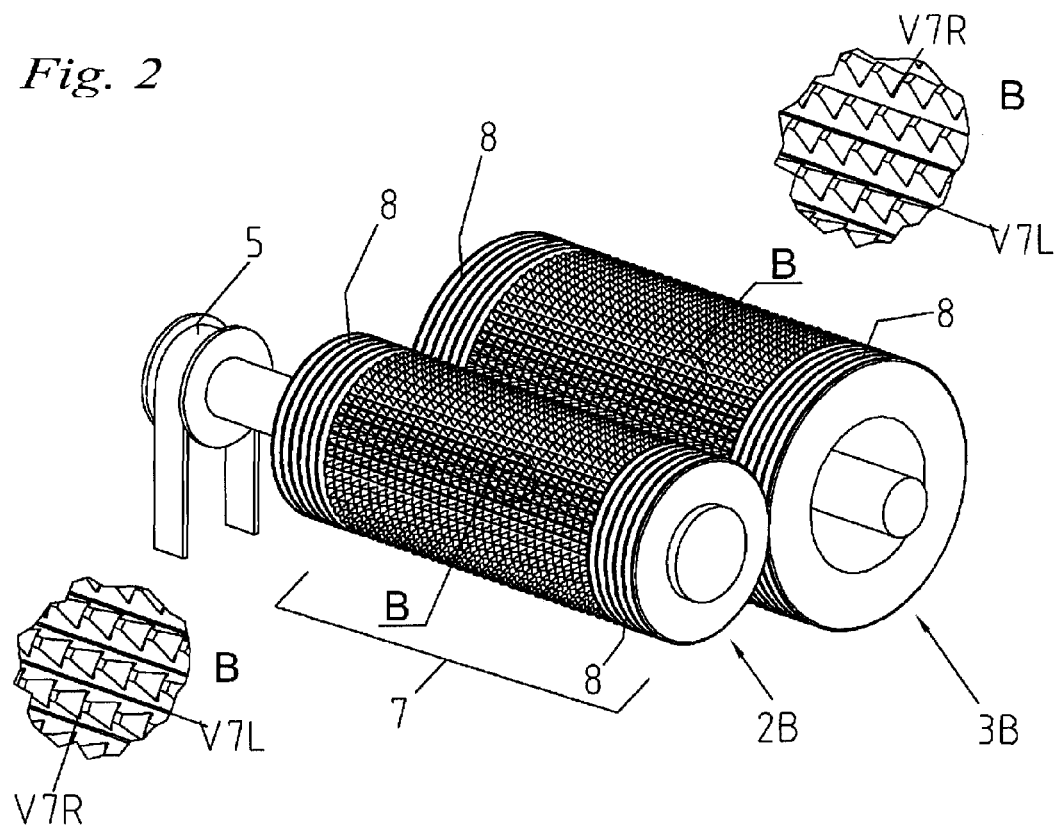
Figure 3:
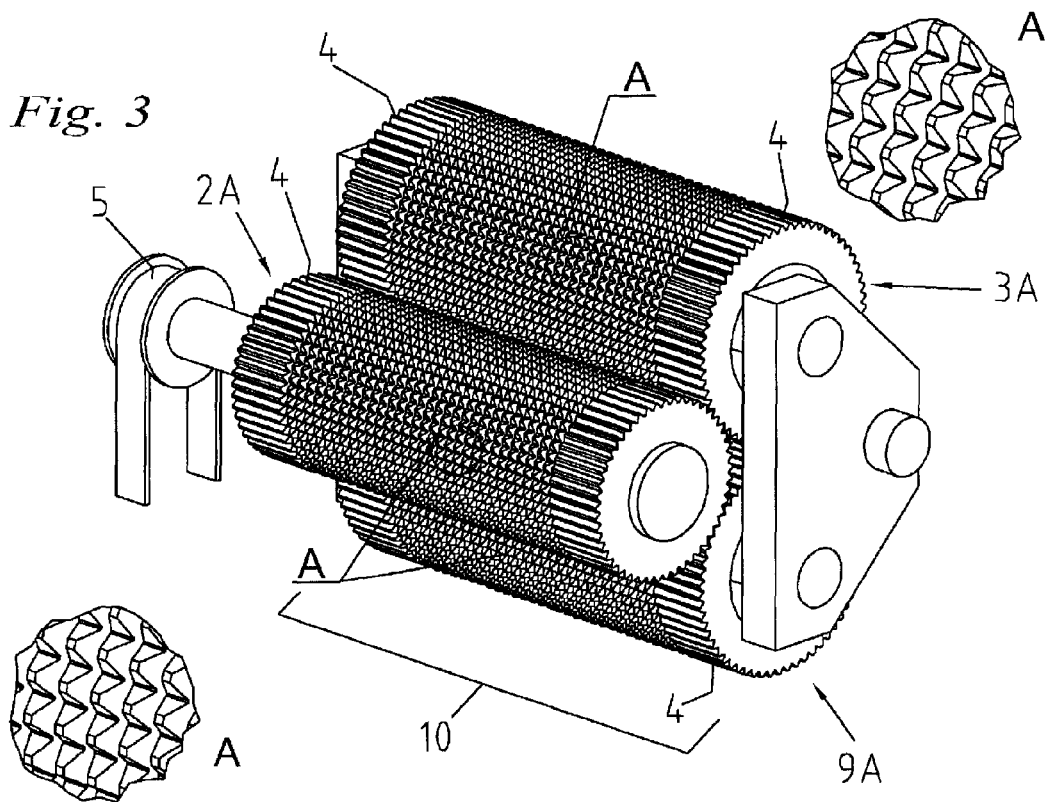
Figure 4:
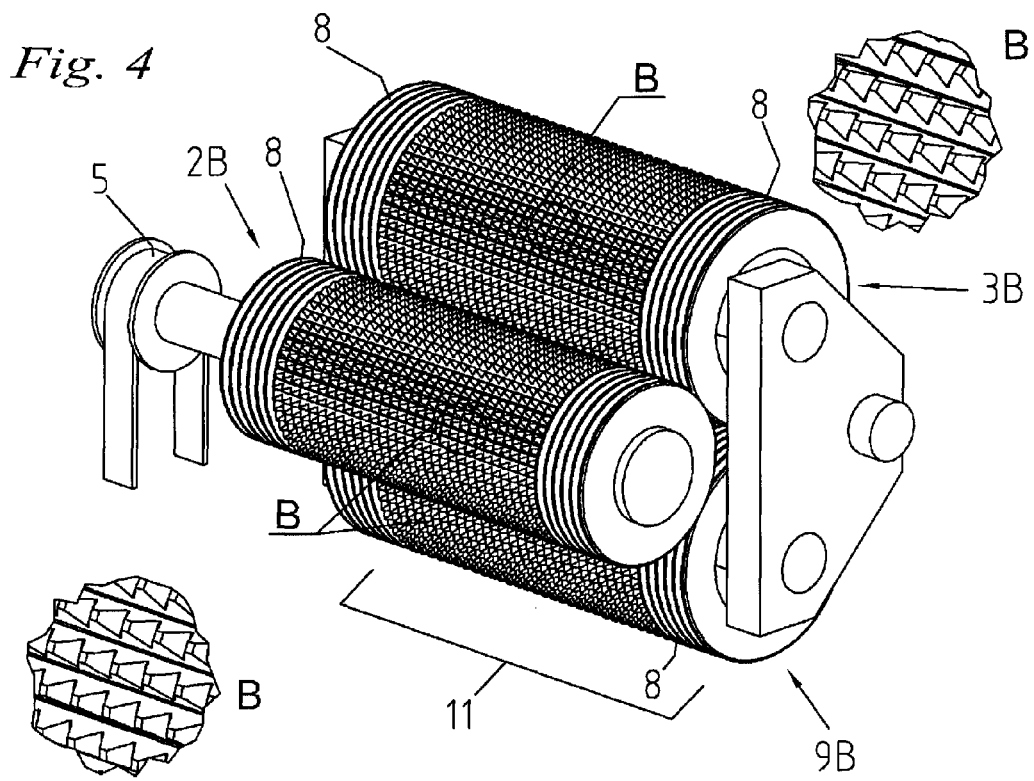
Figure 5:
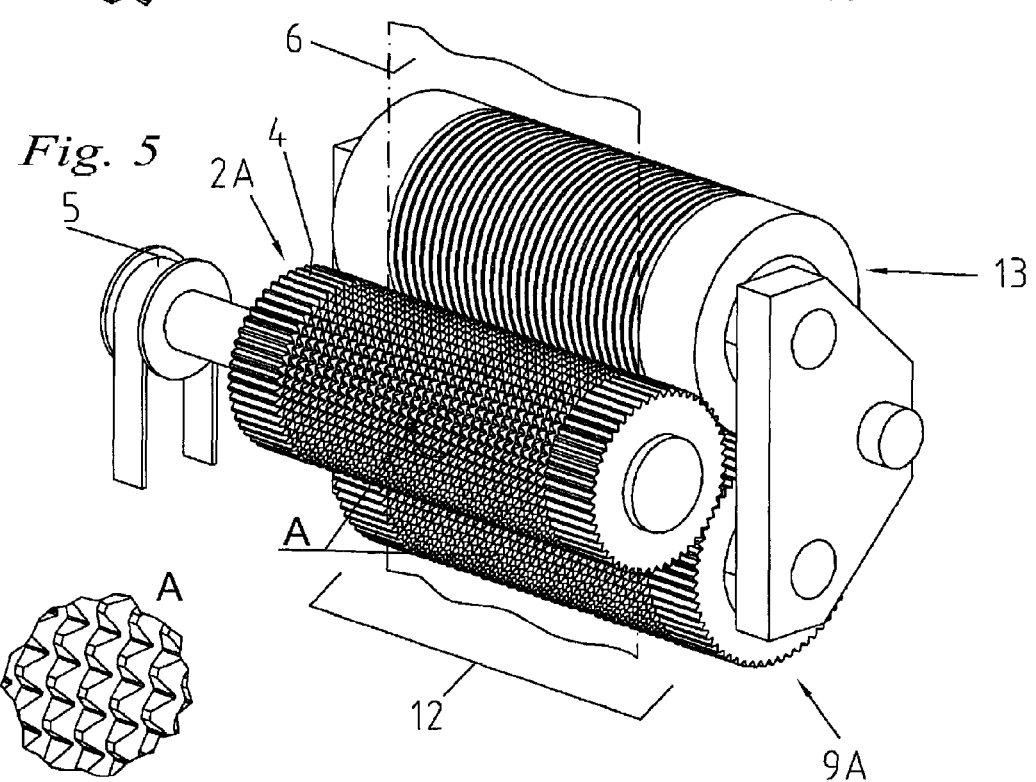
Figure 6:
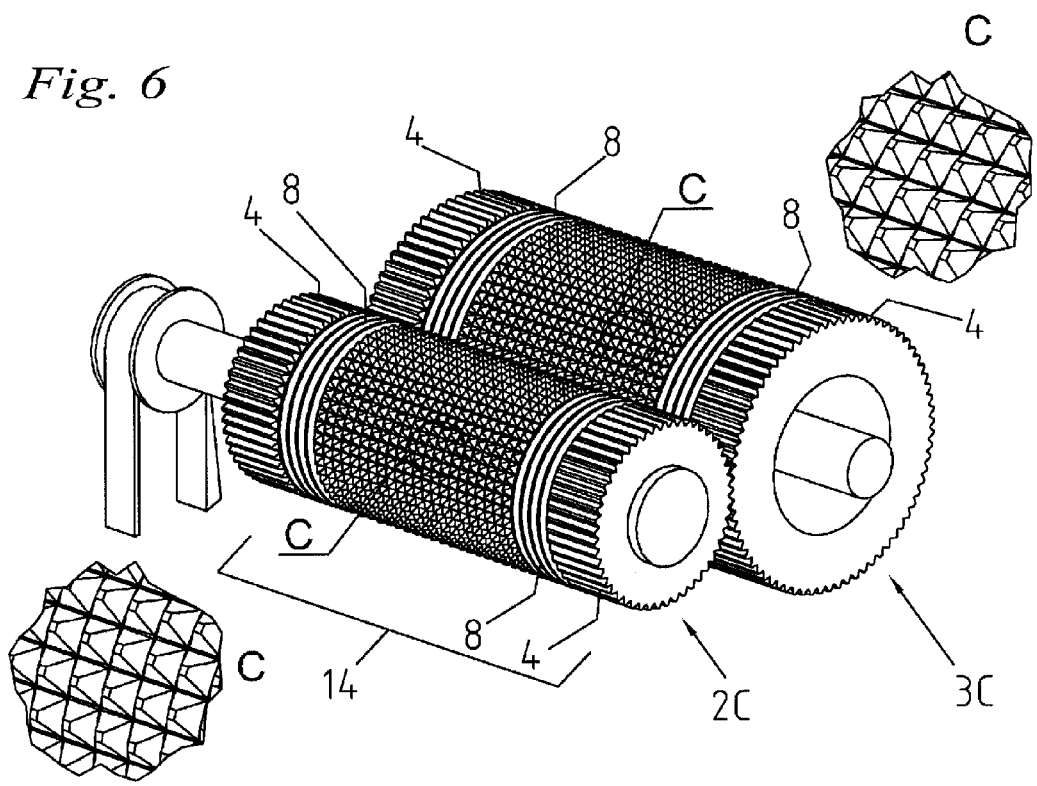
Figure 7:
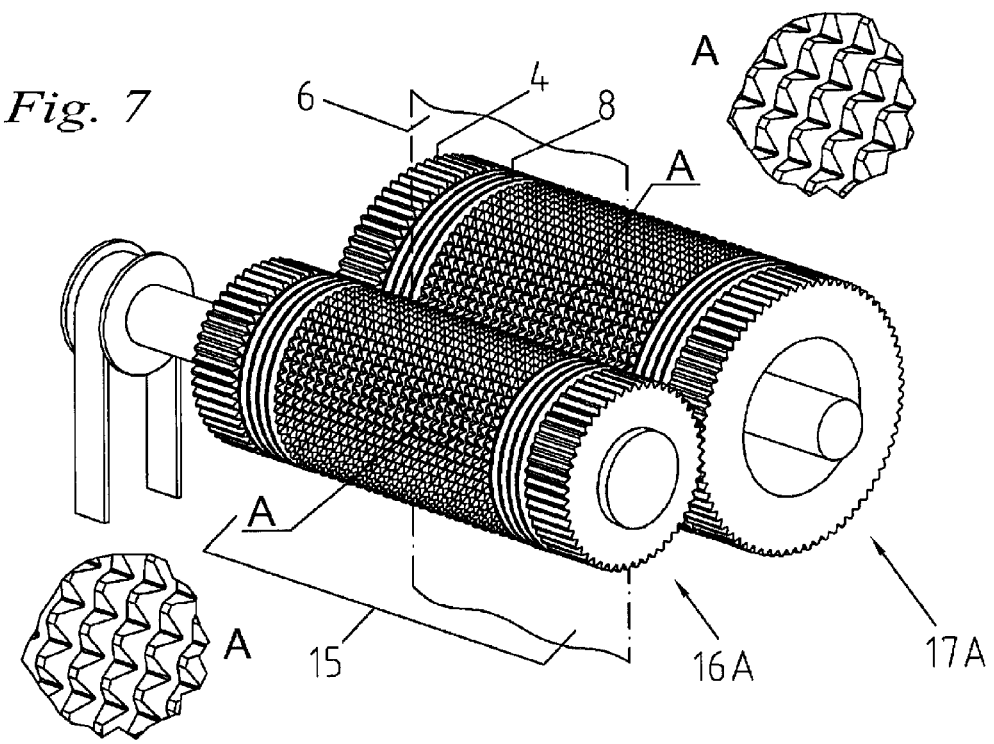
Figure 8:
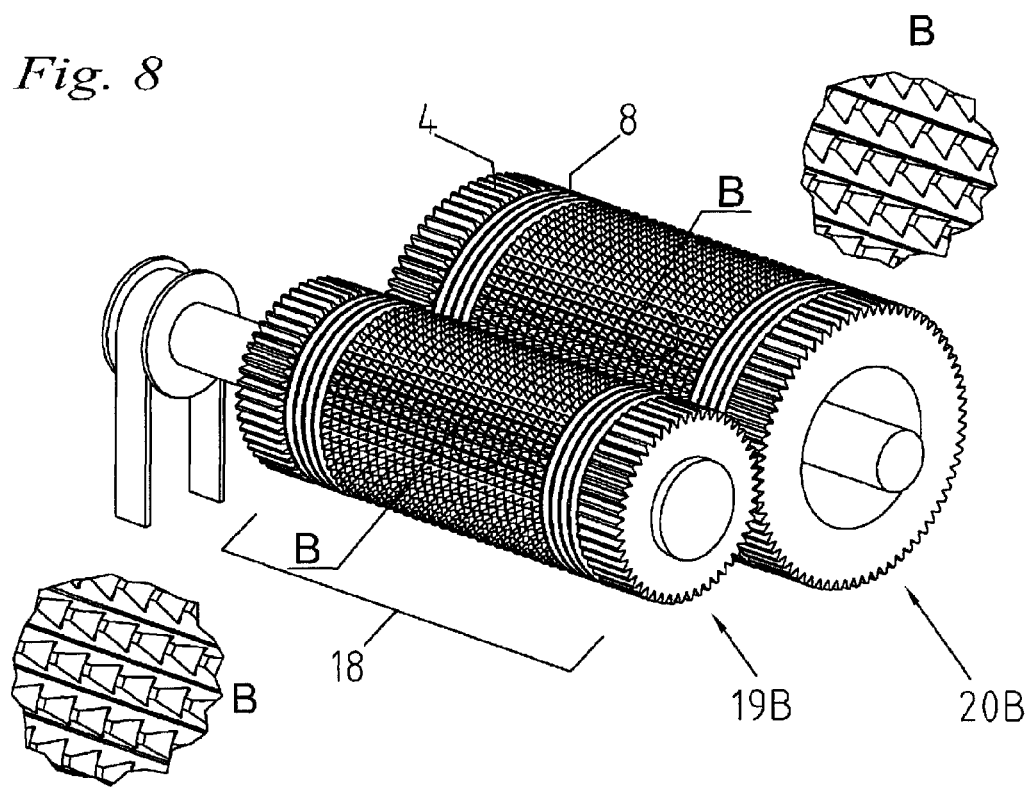
Figure 9:
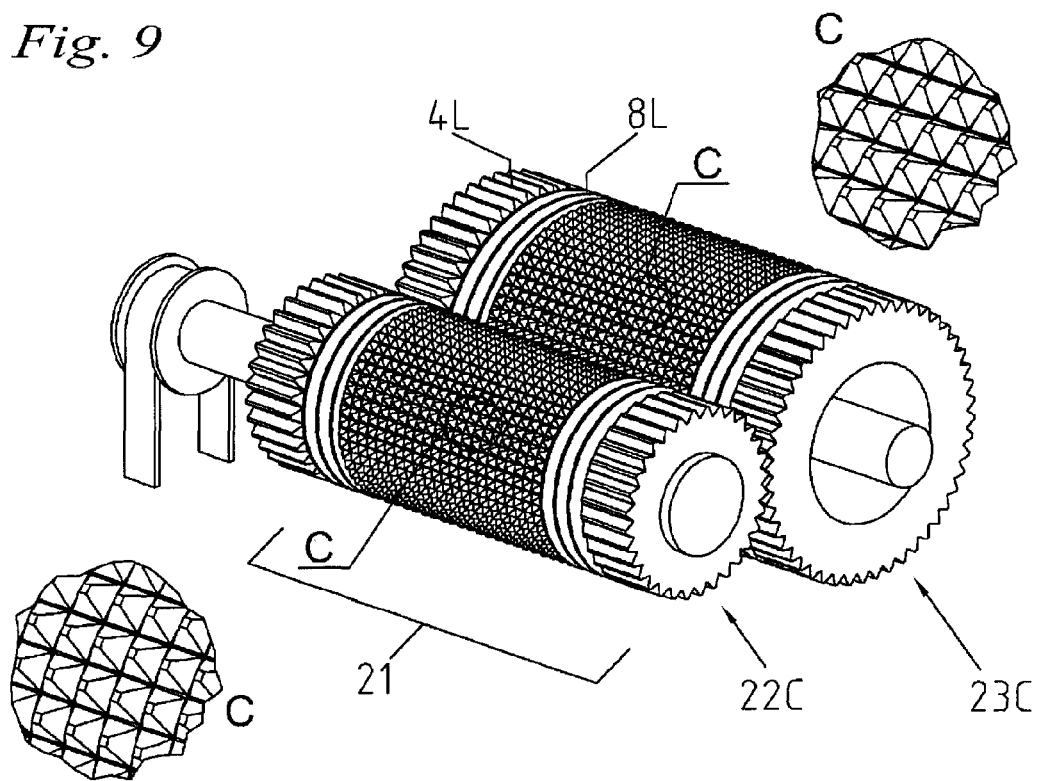
Figure 10:
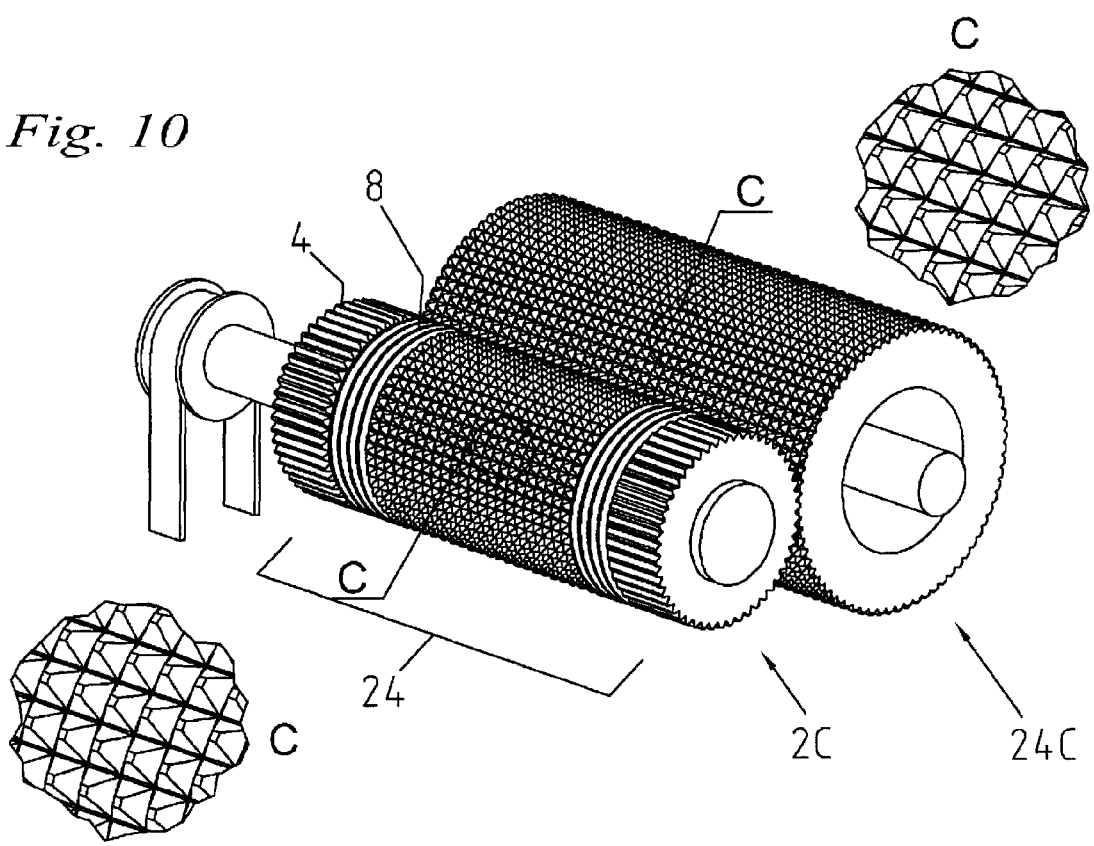
Figure 11:
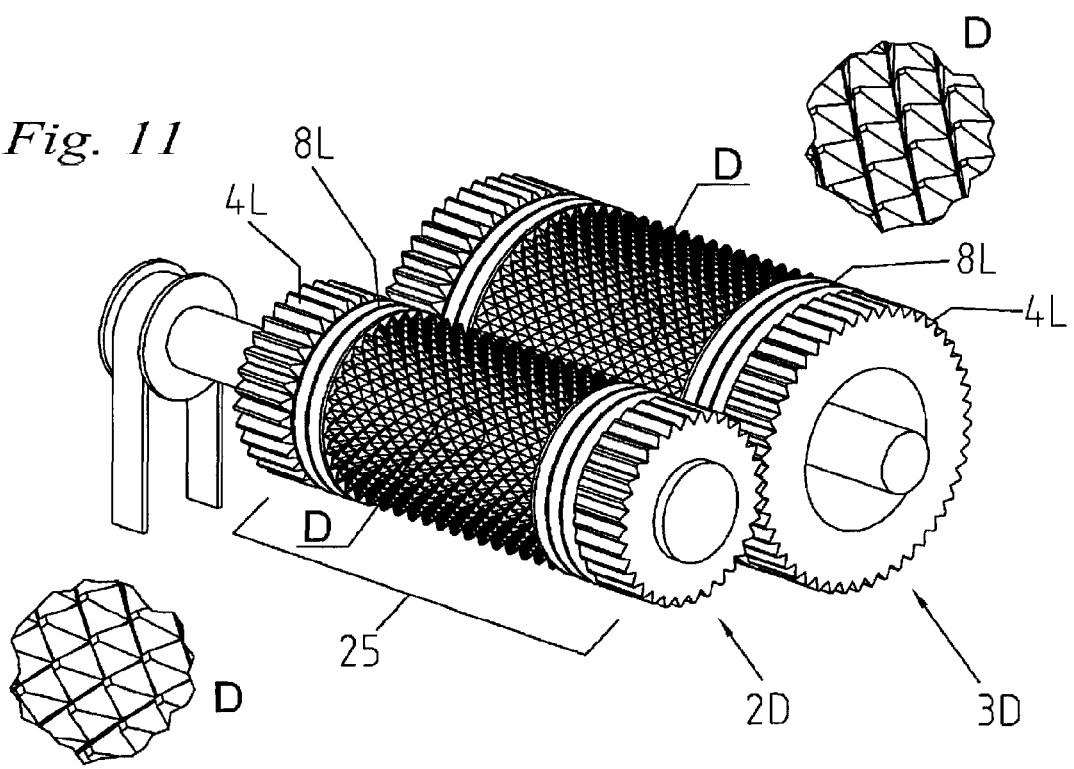
Figure 12:
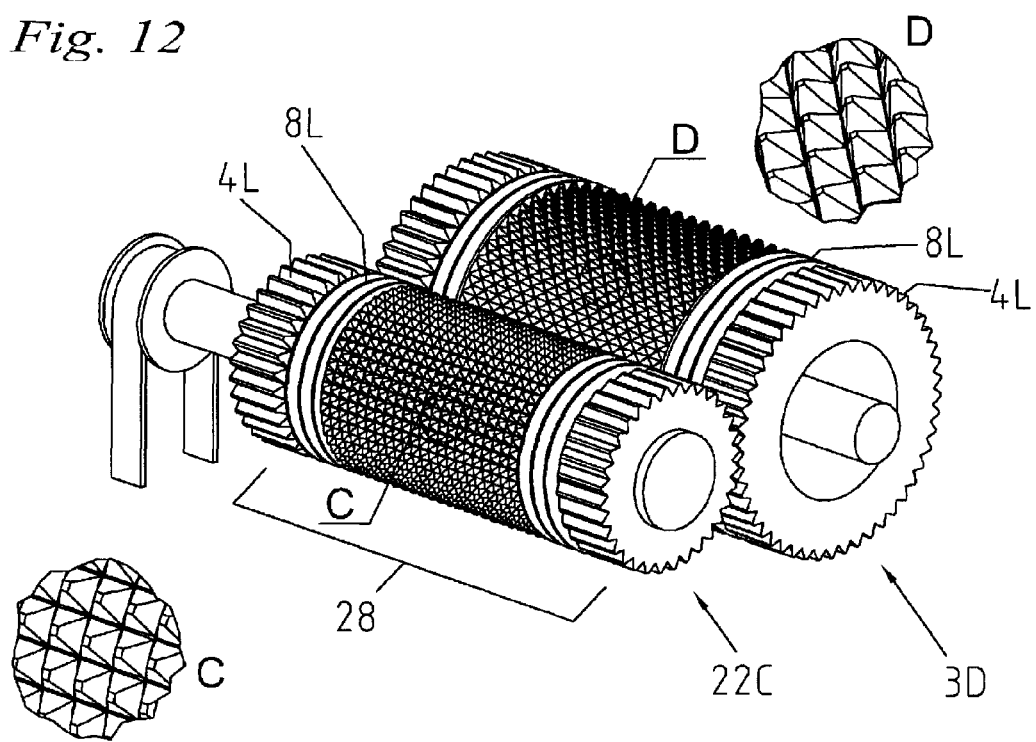
Figure 13:
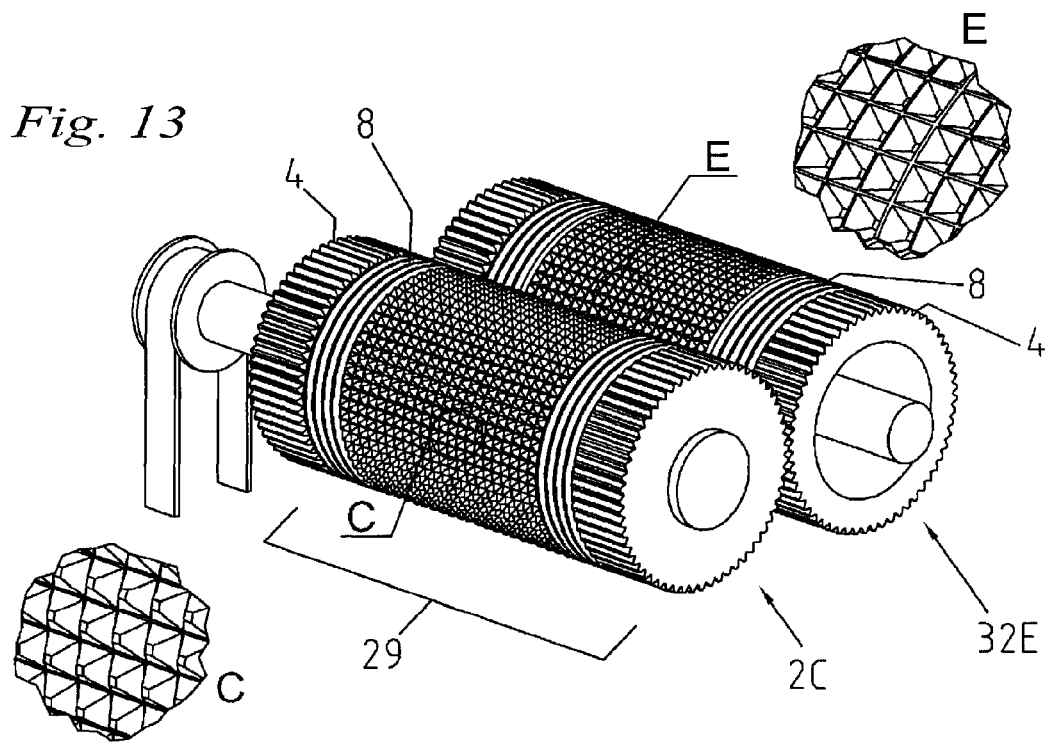
Figure 14:
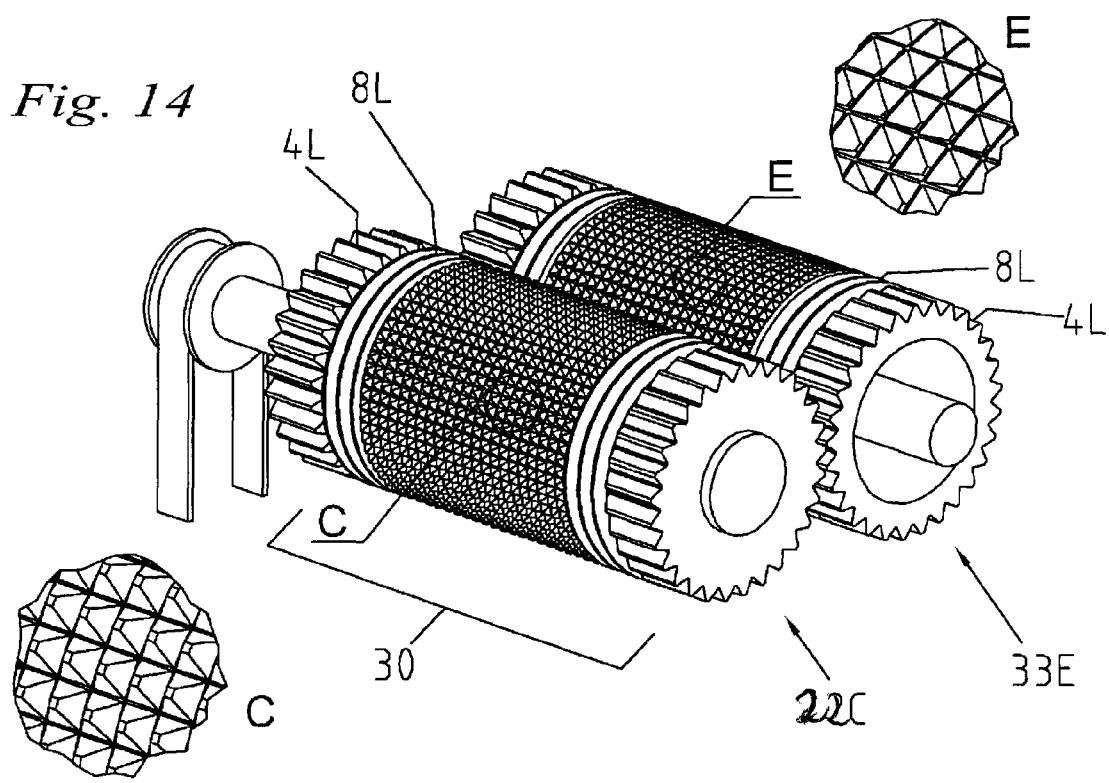
Figure 15:
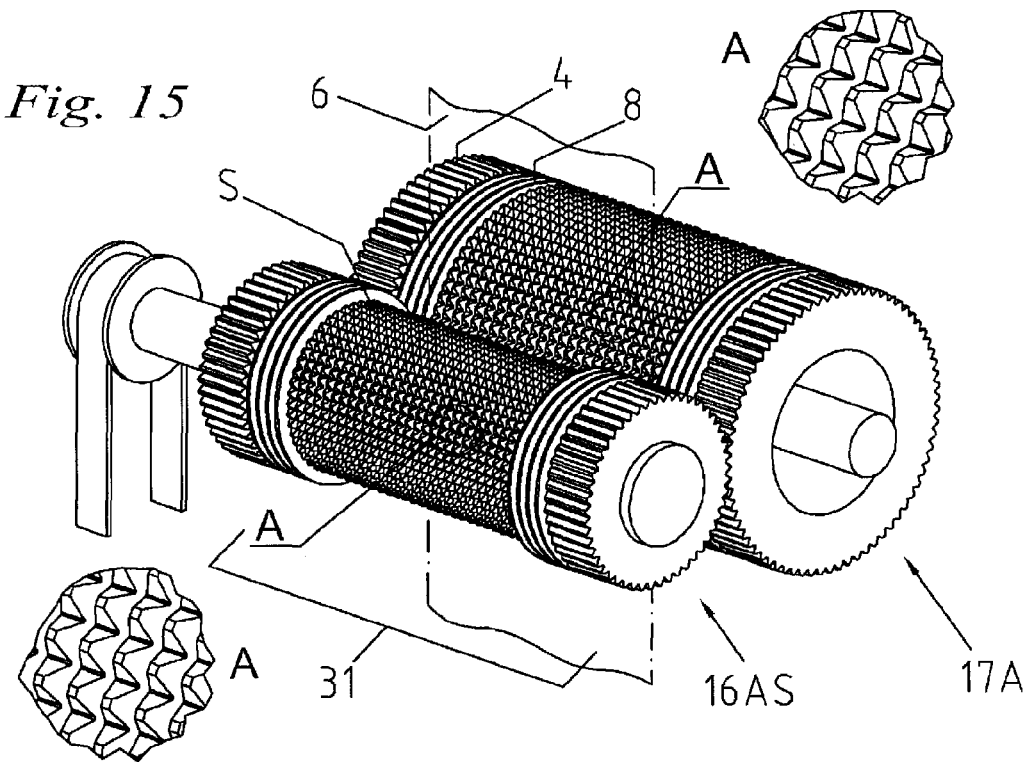
Figure 16:
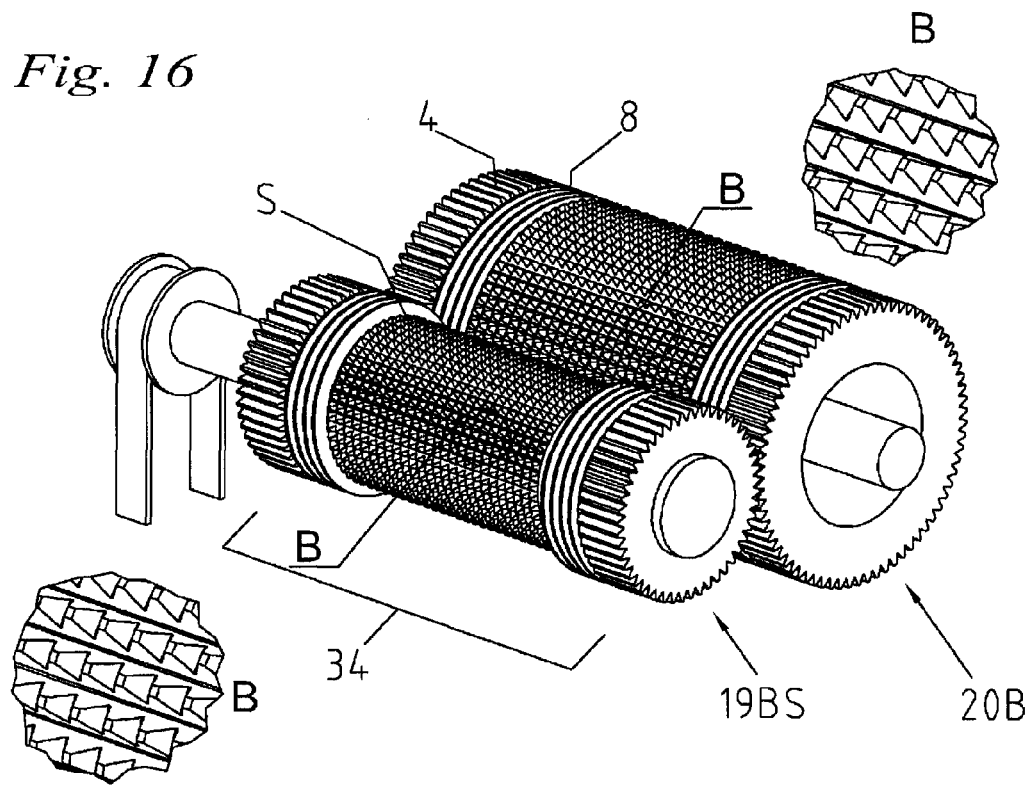
Figure 17:
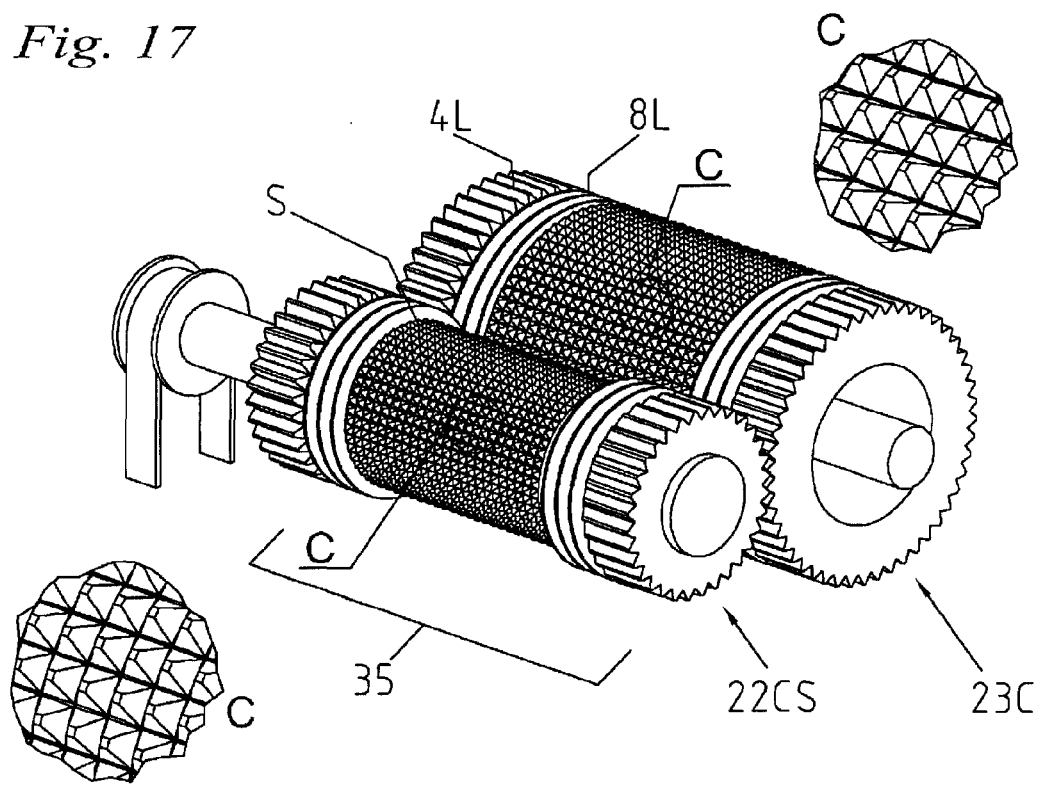
Figure 18:
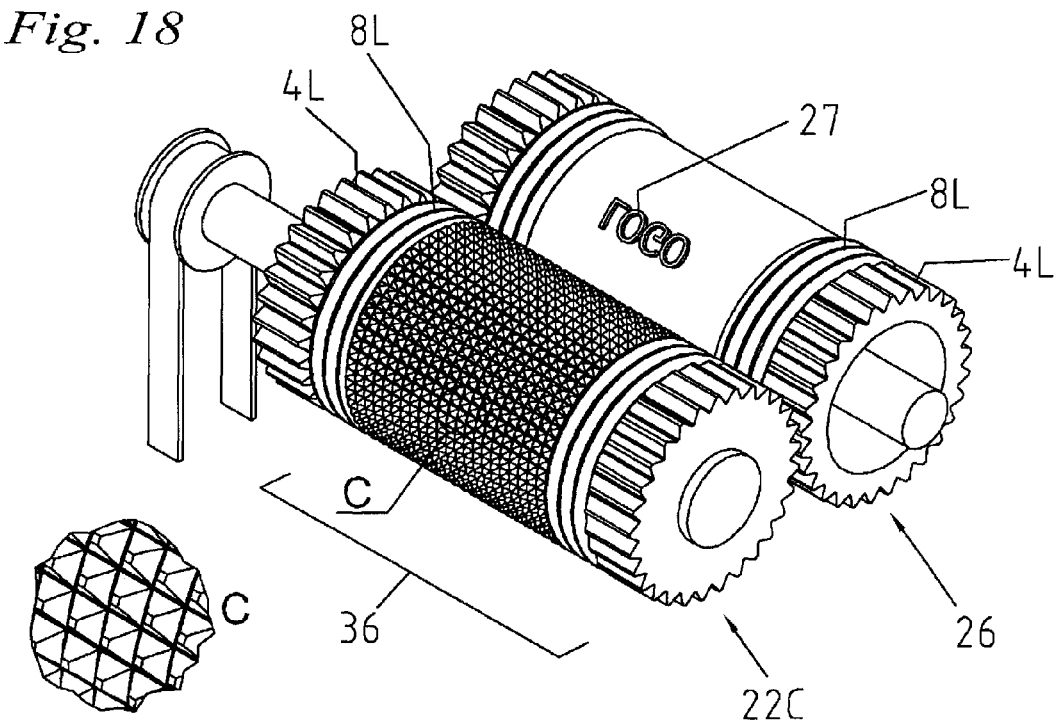
Figure 19:
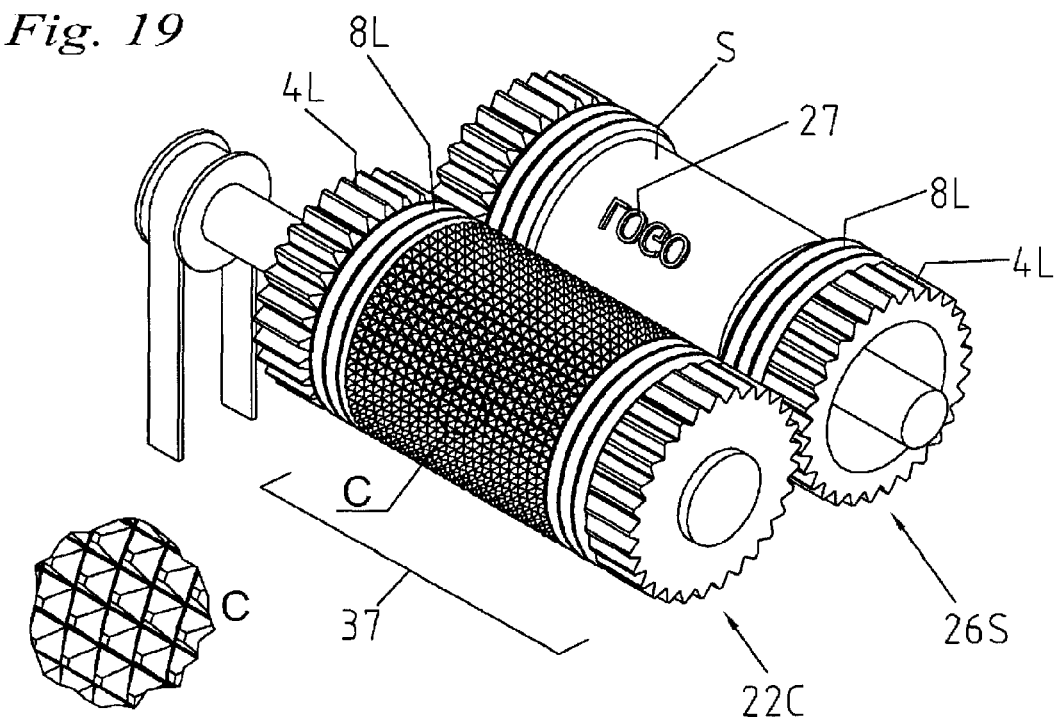
Figure 24:
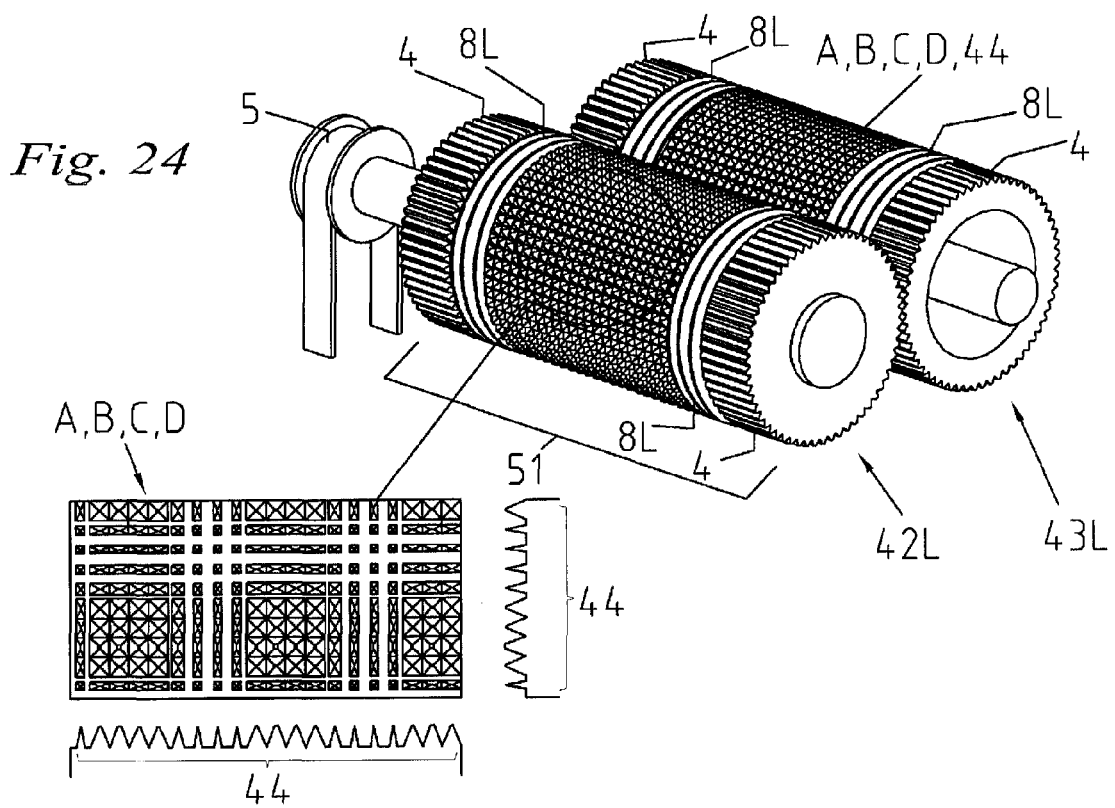
Figure 25:
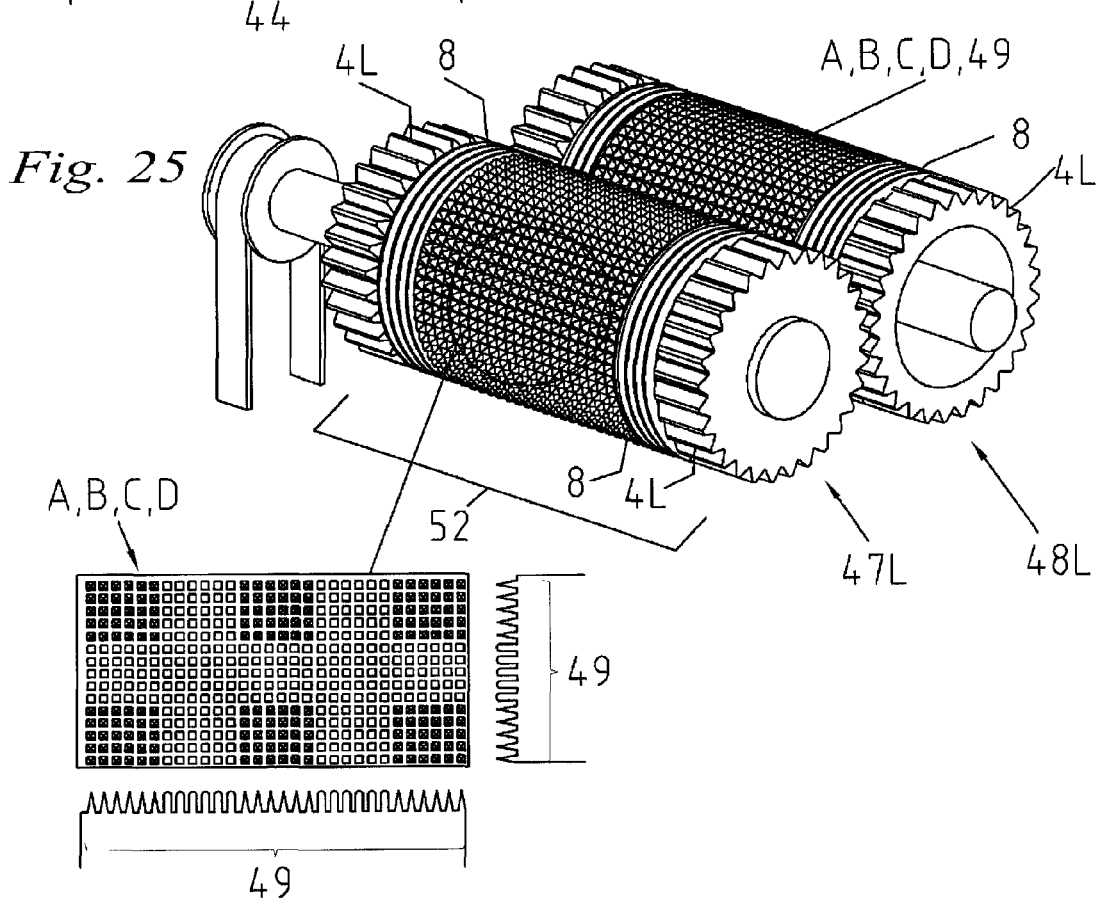

FIG. 1 shows a first exemplary embodiment of a device according to the invention with two rollers having teeth in the pinup-pinup configuration, FIG. 2 shows an embodiment variant of the device of FIG. 1 with different teeth, FIG. 3 shows another embodiment of the invention with three rollers, FIG. 4 shows an embodiment variant of the device of FIG. 3 with different teeth, FIG. 5 shows another embodiment variant of the device of FIG. 3 with inner centering rings, FIG. 6 shows another exemplary embodiment of the device of the invention according to FIG. 1 with different teeth, FIG. 7 shows a variant of the example of FIG. 6 with different teeth, FIG. 8 shows a variant of the example of FIG. 6 with different teeth, FIG. 9 shows a variant of the example of FIG. 6 with different centering elements, FIG. 10 shows another variant of the device of FIG. 1, FIG. 11 shows another variant of FIG. 1 with differently arranged teeth, FIG. 12 shows an embodiment variant of FIG. 11, FIG. 13 shows another exemplary embodiment with teeth in the pinup-pindown configuration, FIG. 14 shows an embodiment variant of the device of FIG. 13, FIG. 15 shows an embodiment variant of the device of FIG. 7, FIG. 16 shows an embodiment variant of the device of FIG. 4, FIG. 17 shows an embodiment variant of the device of FIG. 9, FIGS. 18, 19 show as another exemplary embodiment of the invention two devices for positive embossing, FIG. 20 shows as another exemplary embodiment a device with two rollers having teeth for producing a higher specific embossing pressure, FIG. 21 shows an embodiment variant of the device of FIG. 20 with different teeth, FIG. 22 shows an embodiment variant of the device of FIG. 17 with still other teeth, FIGS. 23 to 25 each show an embodiment variant of FIGS. 20 to 22, FIGS. 26 to 29 show embodiment variants of FIGS. 6 to 9 with regard to the centering elements, and FIG. 30 shows the essential parts of a device of the prior art with two rollers having teeth in a pinup-pinup configuration.

The new structures, either in the logo area or distributed over the entire foil, are produced by varying the specific embossing pressure, i.e. by varying the tooth tips involved in the embossing operation while the total number of teeth remains the same. The increase in specific pressure is mainly but not exclusively produced by reducing the surface area of the tooth tips involved in the embossing operation. Accordingly, an increased surface area of the tooth tips results in a reduction of the specific embossing pressure.

If the number of teeth remains the same, the variation of the specific embossing pressure can be achieved by varying the surface areas of the tooth tips involved in the embossing operation. This means that the pitch, i.e. the periodicity of the teeth, is the same for all teeth in the axial and circumferential directions, respectively. Alternatively, to achieve an increase of the specific embossing pressure, a local heightening of the teeth would be possible.

Such finer and individual tooth structures can no longer be produced with the techniques of the prior art, e.g. according to U.S. Pat. No. 6,176,819 to the applicant of the present invention where the counter-roller(s) is (are) capable of a deviation of a certain amount in all three coordinate directions, and suitable devices and embossing units, respectively, are described hereinafter.

This applies also for the device according to US 2009/05001 to the same applicant or the US 2008/116610, also to the same applicant.

Embossing so-called innerliners for packaging a number of cigarettes, e.g. 20 pieces, by means of an embossing roller arrangement in a so-called pinup-pinup configuration is known from a large number of patents and patent applications to the applicant of the present invention, e.g. from U.S. Pat. No. 5,007,271, U.S. Pat. No. 6,176,819, or U.S. Pat. No. 7,036,347. In this case, by definition, the teeth project from the base cylinder as defined by the plane formed by the valleys between the teeth.

The embossing units of the prior art have in common that they comprise at least one roller pair of which the first roller is driven by a drive 5, e.g. via a belt from the installation or by a separate motor, and this driven roller drives the counter-roller(s) by its teeth via the foil passing therebetween.

In these devices, the metallized surface of the foil is satinized, i.e. provided with a very large number of small indentations which produce a diffuse reflection of the impinging light. By omitting or modifying teeth, a logo is created either as part of the non-embossed, shiny foil surface or as embossed foil surface portions producing various optical effects depending on the light incidence.

Furthermore, U.S. Pat. No. 7,147,453 or EP-2 027 994 A2 to the applicant of the present invention disclose an embossing unit that is composed of three rollers and where in the case that all three rollers are provided with teeth, the driven roller drives the two counter-rollers, or the rollers are linked to each other by synchronizing means.

Basically, two methods for embossing logos are known in the art essentially, the term logo encompassing all kinds of signs, words, decorative or reinforcing elements: On one hand, the embossing of logos in an environment that is defined as being satinized and consists of regularly arranged very small indentations, and where due to the removal or modification of teeth either the unembossed foil surface appears or a modified surface is produced in the corresponding locations whose aspect changes depending on the lighting conditions. This can be referred to as negative logo embossing.

On the other hand, the logo may be embossed by teeth that are arranged in a toothless, flat surrounding area, which can be referred to as positive logo embossing.

Hereinafter, different tooth types A to D will be depicted which are not meant to be limitative, however, and are representative of a large number of tooth types. The sides of the teeth of types A, B, and C are aligned orthogonally to the roller axis whereas the sides of the teeth of type D include an angle with the longitudinal axis that is equal to 45° in the illustrated examples.

FIG. 30 shows an embossing unit 0 of the prior art that has been successfully used for embossing innerliners with teeth of type C in the so-called pinup-pinup configuration as it is e.g. described in U.S. Pat. No. 6,176,819 where the two rollers 01 and 02 have the same teeth C that project from the surface and where one tooth of one roller engages between four teeth of the other rollers, whereby a self-synchronization is achieved. First roller 01 is driven by a schematically illustrated drive 5, the drive possibly also being a motor. Teeth C are pyramidal with a square horizontal projection, are regularly arranged, and have a pitch of 0.3 mm here. The self-synchronization requires that counter-roller 02 has an axle 03 that is movable in the three coordinate directions.

As explained above, such a device with a self-synchronizing tooth arrangement reaches its limits when the specific embossing pressure is to be varied locally in that individual teeth or groups of teeth among the regularly arranged teeth have different tooth shapes with smaller or larger effective surface areas whereby the specific pressure applied to the foil is locally varied in order to produce different patterns thereon. The total number of teeth remains the same. It is further contemplated to emboss logos with different specific embossing pressures over large areas of the entire foil.

The problem of the counter-rollers that are movable in the three coordinate directions is also encountered when the pitch is reduced to e.g. 0.10 mm or finely structured logos are to be produced which are furthermore arranged in an environment without teeth. However, not only the structures are reduced in size but also the rotational speed of the rollers is strongly increased. If e.g. a roller having a circumference of 250 mm and teeth having a spacing of 0.4 mm is operated at a rotational speed of 200 m/min, an interaction time of the teeth of 30 ms results. If the speed is increased to 1000 rpm and the pitch is reduced to 0.2 mm, an interaction time of the teeth of 3 ms results which may become critical. All these problems can be resolved when the rollers are centered both axially and radially.

The axial centering elements include centering rings which engage either in the valleys between corresponding rings on the other roller or in the valleys between the teeth on the other roller. For the circumferential centering, interlocking tooth crowns are contemplated which moreover provide an improved force transmission. These centering elements are very precisely machined, the accuracy of the centering means being less than 20 µm in the axial direction (centering rings) over the entire roller length of e.g. 250 mm and generally less than 5 µm, preferably less than 2 µm in the circumferential direction (tooth crowns) over the circumference of 70 mm. For rollers of different dimensions, these requirements with respect to accuracy vary accordingly.

The following Figures show different embodiments of the invention by way of examples.

According to FIG. 1, embossing unit 1 uses two rollers for embossing a foil strip 6. In FIG. 1, roller 2A driven by drive 5 and counter-roller 3A only comprise teeth of type A. One of the rollers or both rollers comprise a logo area 27 or a toothing 44, 49 for increasing the specific embossing pressure as illustrated and described with reference to FIGS. 20 to 25.

The teeth of type A are pyramidal with a rectangular horizontal projection and are aligned orthogonally to the roller axis, their longitudinal extension being smaller in the axial direction than in the circumferential direction and valleys V1R, measured from the tooth tips, being deeper in the circumferential direction than the valleys V1L in the axial direction. An axial centering of the two rollers is thus achieved.

To achieve a circumferential centering and to ensure the required force transmission from the driven roller to the counter-roller, both rollers 2A and 3A are provided with tooth crowns 4 that are arranged outside the foil width and consequently do not serve for embossing.

Embossing unit 7 of FIG. 2 has two rollers 2B and 3B provided with pyramidal teeth of type B having a rectangular horizontal projection, their longitudinal extension being greater in the axial direction than in the circumferential direction and valleys V7L in the axial direction being deeper than the valleys V7R in the circumferential direction. In this manner, both the circumferential centering and the required force transmission may be sufficient. One of the rollers or both rollers have a logo area 27 or a toothing 44, 49 for increasing the specific embossing pressure as illustrated and described with reference to FIGS. 20 to 25.

To achieve an axial centering, centering rings 8 are arranged on both sides of both rollers outside the foil, the rollers being arranged such that the centering rings of one roller each engage between two respective centering rings of the other roller.

Embossing unit 10 according to FIG. 3 has three rollers 2A, 3A, 9A provided with teeth of type A and, as embossing unit 1, with tooth crowns 4, the driven roller 2A driving the other two rollers. One, two, or all three rollers may have a logo area 27 or a toothing 44, 49 for increasing the specific embossing pressure as illustrated and described with reference to FIGS. 20 to 25.

Embossing unit 11 of FIG. 4 also comprises three rollers 2B, 3B, 9B provided with teeth of type B and, analogously to embossing unit 7 of FIG. 2, with centering rings 8, one, two, or all three roller(s) having a logo area 27 or a toothing 44, 49 for increasing the specific embossing pressure as illustrated and described with reference to FIGS. 20 to 25.

Embossing unit 12 according to FIG. 5 comprises two rollers 2A and 9A as in FIG. 3 and a centering roller 13 that is provided with centering rings 8 only, rollers 2A and/or 9A having a logo area 27 or a toothing 44, 49 for increasing the specific embossing pressure as illustrated and described with reference to FIGS. 20 to 25.

Embossing unit 14 according to FIG. 6 comprises two rollers 2C and 3C in analogy to FIG. 2, however with the teeth of type C and thus with tooth crowns 4 and centering rings 8. Also, rollers 2C and/or 3C have a logo area 27 or a toothing 44, 49 for increasing the specific embossing pressure as illustrated and described with reference to FIGS. 20 to 25.

According to FIG. 7, embossing unit 15 comprises two rollers 16A and 17A with teeth of type A that are provided with tooth crowns 4 and centering rings 8. Also, rollers 16A and/or 17A have a logo area 27 or a toothing 44, 49 for increasing the specific embossing pressure as illustrated and described with reference to FIGS. 20 to 25. In FIG. 7, foil web 6 is depicted.

According to FIG. 8, embossing unit 18 comprises two rollers 19B and 20B with teeth of type B that are provided with tooth crowns 4 and centering rings 8. Also, rollers 19B and/or 20B have a logo area 27 or a toothing 44, 49 for increasing the specific embossing pressure as illustrated and described with reference to FIGS. 20 to 25.

According to FIG. 9, embossing unit 21 comprises two rollers 22C and 23C with teeth of type C that are provided with tooth crowns 4 and centering rings 8. In this example, tooth crowns 8L have coarser teeth and the centering rings have a larger spacing than tooth crowns 4 and centering rings 8, respectively. Also, rollers 22C and/or 23C have a logo area 27 or a toothing 44, 49 for increasing the specific embossing pressure as illustrated and described with reference to FIGS. 20 to 25.

Embossing unit 24 of FIG. 10 comprises a roller 2C and a roller 24C that has only teeth of type C but neither tooth crowns nor centering rings. Also, rollers 2C and/or 24C have a logo area 27 or a toothing 44, 49 for increasing the specific embossing pressure as illustrated and described with reference to FIGS. 20 to 25.

Embossing unit 25 according to FIG. 11 comprises a driven roller 2D and a counter-roller 3D with teeth of type D. As appears in the enlarged view, the sides of the pyramidal teeth are inclined at an angle to the roller axis that is equal to 45° here. Teeth D and their arrangement as well as centering elements 4L, 8L are the same on both rollers.

Also, rollers 2C and/or 24C may have a logo area 27 or a toothing 44, 49 for increasing the specific embossing pressure as illustrated and described with reference to FIGS. 20 to 25.

In FIG. 12 an embossing unit 28 comprising a combination of a roller 22C of FIG. 9 and a roller 3D of FIG. 11 is illustrated, i.e. with pyramidal teeth that are arranged orthogonally to the roller axis on roller 22C and at angle thereto on the other roller 3D. Both rollers are provided with the coarser centering elements 4L and 8L, and one or both rollers have a logo area 27 or a toothing 44, 49 for increasing the specific embossing pressure as illustrated and described with reference to FIGS. 20 to 25.

Embossing units 29 and 30 according to FIGS. 13 and 14 show a so-called pinup-pindown configuration. Embossing unit 29 comprises a driven roller 2C with projecting teeth of type C and a roller 32E having recesses E corresponding to teeth C, see the enlarged views. Such a pinup-pindown unit requires a precise synchronization of the rollers that is ensured by tooth crowns 4 and centering rings 8. Embossing roller 2C has a logo area 27 or a toothing 44, 49 as described with reference to FIGS. 20 to 25.

Embossing unit 30 of FIG. 14 is a variant of embossing unit 29 comprising roller 22C and counter-roller 33E, both with the coarser tooth crowns 4L and centering rings 8L.

In the embossing devices according to FIGS. 1 to 14, the centering elements primarily serve as pre-centering elements up to the moment when the foil to be embossed is introduced. In this operation, two steps can be distinguished:
  a) The rollers are adjusted so that a clearance from 0.5 mm to some mm remains between the rollers to allowing a comfortable threading of the foil, and
  b) The mutual distance of the rollers is reduced, generally pneumatically, until the correct embossing pressure is set which is dependent on various factors.

The interlocking centering elements may further prevent that the pyramid tips may enter into contact in case of a foil rupture. This effect can be enhanced by lowering the tooth surfaces by an amount S in the order of magnitude of the foil thickness. The depression extends on a length that is slightly greater than the width of the foil. As a result, the overall roller diameter is reduced by S=0.02 to 0.2 mm in the corresponding locations. In addition, this depression S ensures a more regular embossing across the entire foil width. The depression S may be provided on one roller, generally the embossing roller, or arranged on two or three rollers.

FIGS. 15 to 17 show different embodiments of overall depression S. According to FIG. 15 a depression S is provided on driven roller 16AS of embossing unit 31. FIG. 16 shows embossing unit 34 with the three-roller system in analogy to the system of FIG. 4, and it is apparent that depression S is composed of two depressions S' which together form the depressions S for pair 19BS', 20BS' or 19BS', 9BS', respectively.

FIG. 17 shows embossing unit 35 with rollers 22CS" and 23CS''' in analogy to the embossing unit according to FIG. 9 having respective depressions S", S''' which together form depression S. The partial depressions may be identical or take different values. The rollers according to FIGS. 15 to 17 also have logo areas 27 or the toothing 44, 49, either on one or on two or three rollers. The rollers are provided with the centering elements 4, 4L; 8, 8L.

In a satinizing process with simultaneous negative logo embossing on innerliners, the metallized surface of the foil is being embossed. Mostly only the driven roller is provided with the logos while the counter-roller(s) are only provided with teeth. When logo areas with teeth for producing a varying specific embossing pressure are used, either only one roller, the driven one, or two or all rollers can be provided with the same logo area or with the special toothing.

For embossing non-metallized foils, however, it is advantageous to provide the logos on one of the non-driven embossing rollers in order to obtain positive salient logos on the other side of the foil. To this end, embossing units 36 and 37 of FIGS. 18 and 19 comprise a roller 22C and a roller 26 or 26S, respectively, both rollers being provided with the coarser tooth crowns 4L and centering rings 8L. These embossing units are intended for positive embossing of foils, the driven roller 22C e.g. only having teeth of type C in this example while embossing rollers 26 or 26S are only provided with the embossing areas 27 which form the word LOGO here. Here, centering elements 4L, 8L further prevent a pitching movement of the rollers in the toothless portions.

In embossing unit 37 according to FIG. 19, overall depression S is provided on embossing roller 26S. Particularly for rollers having relatively few teeth that form the logo it is advantageous if the centering elements not only center the rollers but also prevent a pitching movement of the latter.

The technique of embossing small indentations or elevations in certain areas in the pinup-pinup constellation according to FIG. 18 or 19 further makes it possible to use relatively thin wrapping foils for packaging boxes for high-grade goods such as electronic parts or watches, or cigarette packets, expensive pharmaceuticals, or foods such as cheese or chocolate with or without logos in the online process that are provided with reinforcement zones in critical locations, i.e. at the edges where there is a risk that the foil may be torn.

In FIGS. 20 to 25, the concept of a variable embossing pressure is schematically depicted. FIGS. 23 to 25 correspond to FIGS. 20 to 22, however with different centering elements. FIG. 23 shows coarser but not less precise centering elements 4L and 8L of both types, FIG. 24 the coarser centering rings 8L, and FIG. 25 the coarser tooth crowns 4L.

According to FIG. 20 or 23, in the continuum of teeth with or without logos of the prior art, a logo area 27 is provided that may also comprise several partial areas. The two rollers 40 and 41 of embossing unit 38 or the rollers 40L and 41L of embossing unit 50 are provided with the tooth crowns 4 and 4L, respectively, and with the centering rings 8 and 8L, respectively. The rollers may have teeth of type A to D or any other pyramidal or conical teeth. Alternatively, counter-roller 41 or 41L may be provided with logo area 27 and embossing roller 40, 40L with depression S.

Logo area 27 on roller 40, 40L of embossing unit 38, 50 has teeth 39 which include a sharper angle than the other teeth both in the axial and in the circumferential directions and thus form a wider valley since they have the same pitch as the other teeth. The sharper angle results in a narrower tooth tip and produces an increased specific embossing pressure in the embossed area.

FIGS. 21, 24 and 22, 25 schematically illustrate an addition to the former embossing technique for packaging foils, more particularly innerliners in that rather than arranging logo areas of variable specific embossing pressure within a satinized environment with or without logos of the prior art, the special logos that may comprise very small areas are provided over the entire width of the foil, producing a variable specific embossing pressure on the foil.

FIGS. 21 and 24 show two rollers 42, 42L and 43, 43L of embossing units 45, 51 of which at least one roller 42, 42L has a toothing 44 whose teeth include varying angles both in the axial and in the circumferential direction and thus valleys of varying widths therebetween but all of which have the same pitch in the axial and circumferential directions, respectively.

The varying angles produce a variable specific embossing pressure in the embossed area. Acute angles produce an increased specific pressure and obtuse angles a reduced one. Counter-roller 43, 43L may have teeth of types A, B, C, D with or without toothing 44 and with or without logos of the prior art. Rollers 42L and 43L are both provided with regular tooth crowns 4 and coarser centering rings 8L. Roller 42, 42L may be provided with depression S.

FIGS. 22 and 25 are embodiment variants of FIGS. 21 and 24, respectively, where toothing 49 on roller 47, 47L and/or 48, 48L of embossing units 46, 52 comprises further types of teeth whose tips may also have a rounded shape, in which case the specific embossing pressure is reduced. Here also, the pitch of the entire toothing 49 is the same in the circumferential and in the axial directions, respectively. Rollers 47L and 48L are provided with tooth crowns 8 and coarser centering rings 4L. Furthermore, embossing rollers 47, 47L may be provided with a depression S.

Figure 26:
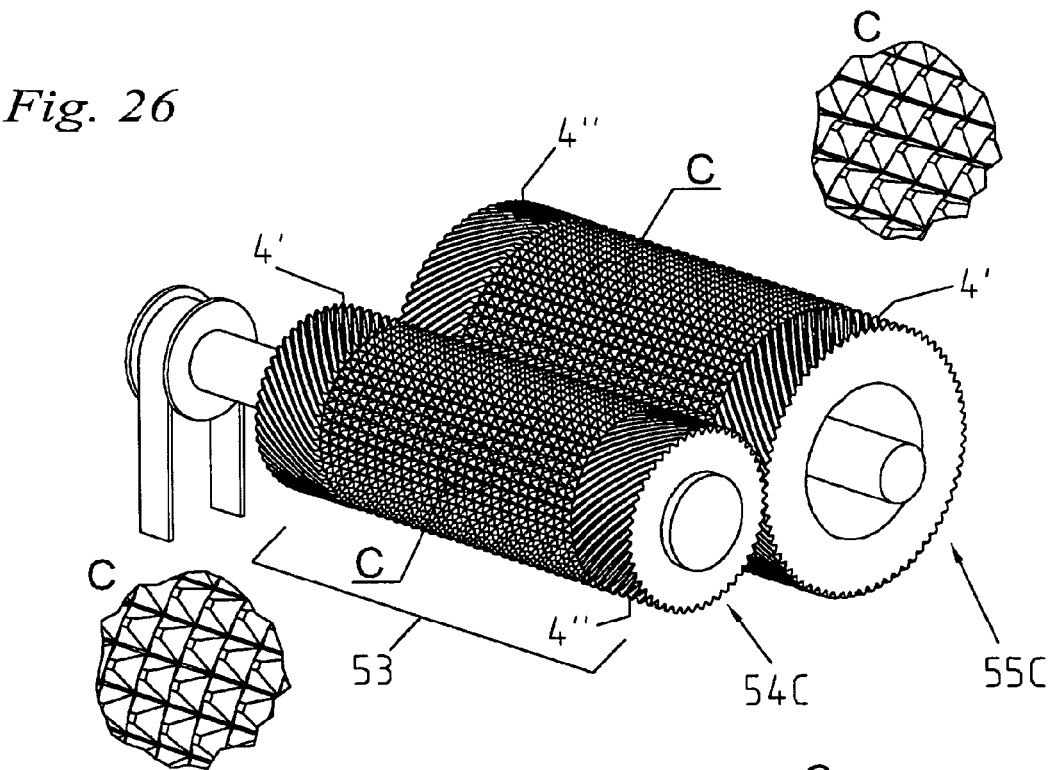

FIGS. 26 to 29 show embodiment variants of the tooth crowns for axial and circumferential centering. FIG. 26 shows an embossing unit 53 comprising driven roller 54C with teeth of type C and a counter-roller 55C, also with teeth of type C. In contrast to the preceding examples, tooth crowns 4', 4" have a helical toothing that may e.g. be an involute toothing, the direction of the teeth with respect to the circumferential direction being different on both sides of the rollers and also that of the cooperating tooth crowns. Different directions of the helical toothings on a roller result in a reduced axle load.

Figure 27:
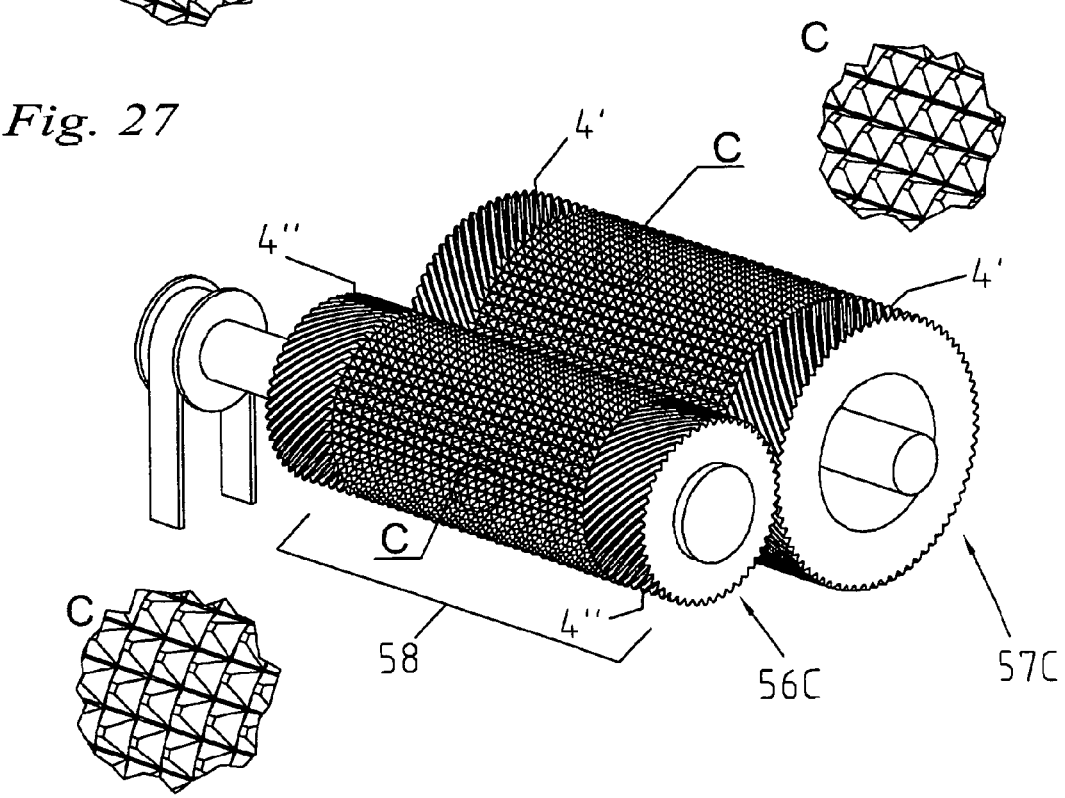

In FIG. 27, the teeth of tooth crowns 8', 8" of rollers 56C and 57C of embossing unit 58 have the same direction at both ends whereas the directions of the respective cooperating teeth are different.

Figure 28:
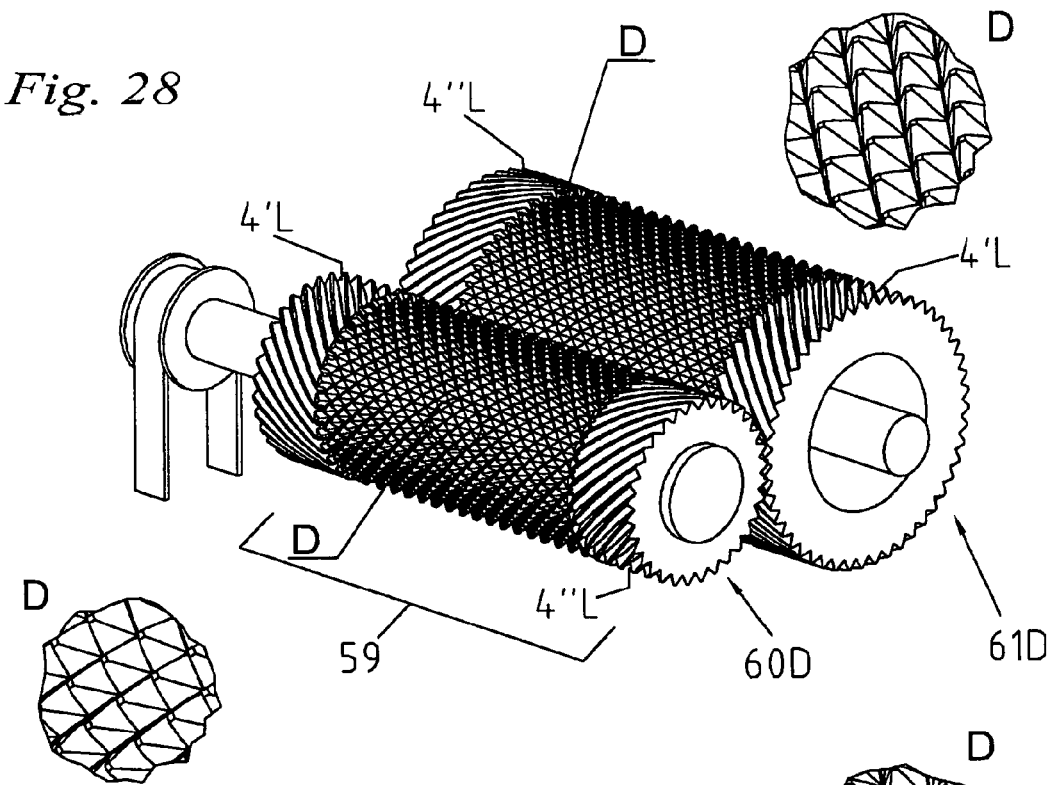

FIG. 28 shows an embossing unit 59 comprising rollers 60D and 61D with teeth of type D, analogously to the embossing unit according to FIG. 11. Tooth crowns 4'L and 4"L correspond to tooth crowns 4' and 4" according to FIG. 26, however in a coarser embodiment.

Figure 29:
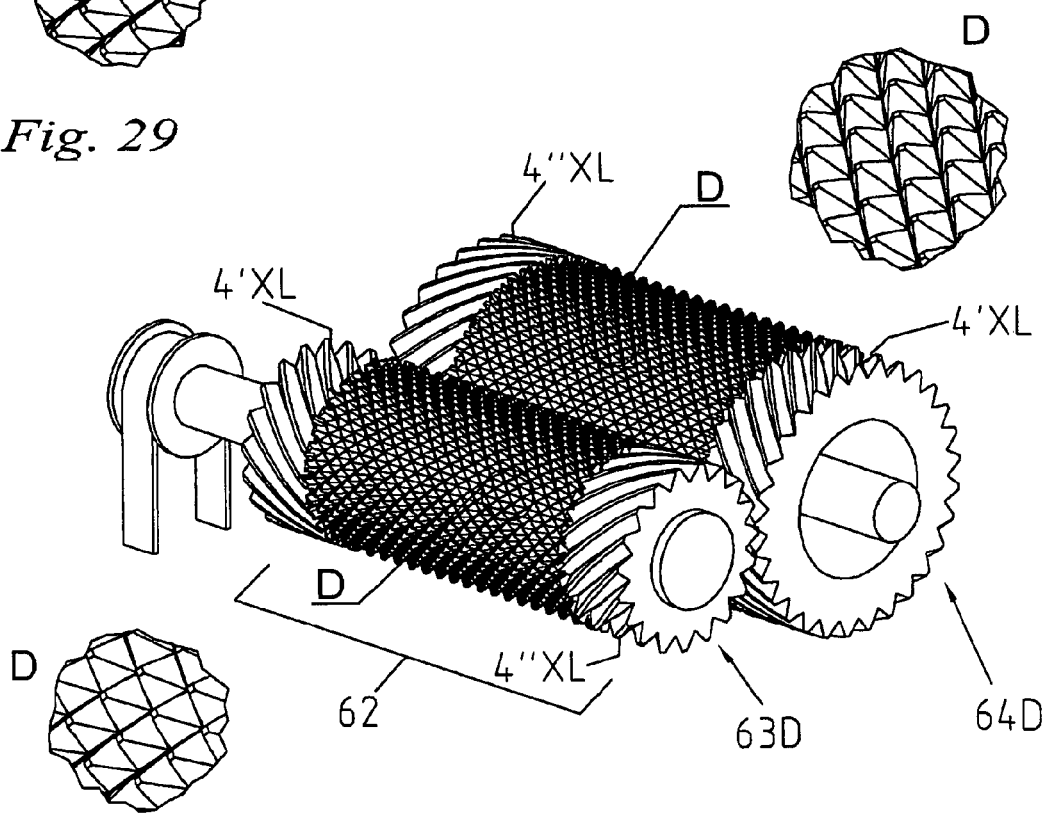

FIG. 29 corresponds to FIG. 28 while rollers 63D and 64D of embossing unit 62 have even coarser tooth crowns 4'XL and 4"XL that are aligned as previously.

In addition to other advantages that are known per se, such helical toothings provide a precise centering both axially and circumferentially. The rollers according to FIGS. 26 to 29 also have logo areas 27 or the toothing 44, 49, either on one or on both rollers, and may further have a depression S.

According to the present application, the pitch is the same not only on one of the rollers but on all cooperating rollers both in the circumferential and in the axial directions, respectively.

As explained above, the sides of the teeth need not necessarily be orthogonal to the longitudinal axis of the roller and may include any angle between 1° and 89°. The teeth may have a pitch between tips of 0.05 mm to 0.4 mm for a theoretical height without flattened portions of 0.03 mm to 0.3 mm. Finally, the teeth may also have a round cross-section and a conical profile as the rollers are provided with centering and driving means that serve as synchronizing means too.

Also, logo areas 27 or an individual logo area 27 may comprise conventional logos having either been produced by omitting teeth and/or by teeth producing what is called a shadow embossing in the prior art, or such areas may be produced in an environment comprising such logos. Toothing 44, 49 for producing a variable specific embossing pressure may also comprise the aforementioned logos.

In the foregoing description, centering elements 4, 4L, 4', 4", 4'L, 4"L, 4'XL, 4"XL, 8, 8L have always been mentioned in the context of the teeth or patterns for producing a variable specific embossing pressure, but these centering elements are also advantageous in applications beyond these teeth and patterns, e.g. in the case of a very small pitch or particularly precise patterns.

The invention claimed is:

1. A device for embossing foils comprising:
at least two rollers, at least one of which is an embossing roller and at least one of which is driven by a drive, at least the embossing roller having regularly arranged teeth that project from a base cylinder,
wherein for producing logos on a foil, at least the embossing roller has a logo area with teeth or a toothing that is different from the regularly arranged teeth, all teeth having a same periodicity of the toothing respectively in circumferential and axial directions,
wherein in order to produce a variable specific embossing pressure on the foil, at least one of the rollers having both axially and radially acting centering elements cooperates with at least one other roller having at least one centering element for centering the embossing roller with respect to the at least one other roller, and
wherein the centering elements include
centering rings disposed on both sides of and outside an embossing zone and engage between centering rings or teeth of the other roller so as to prevent an axial displacement, and
tooth crowns disposed on both sides of and outside an embossing zone, adjacent to the centering rings, the tooth crowns engaging with tooth crowns of the other roller so as to prevent circumferential slippage, improve force transmission and provide synchronization.

2. The device according to claim 1, wherein in order to vary the embossing pressure, the teeth or the toothing of at least the embossing roller have different embossing tip surfaces with varying angles of sides thereof, smaller horizontal projections, rounded surfaces, or a combination thereof, and the teeth or the toothing have a same pitch.

3. The device according to claim 1, wherein a dimensional accuracy of the centering rings, for a tooth pitch of 0.3 mm and a roller length of 250 mm, is smaller than 20 µm.

4. The device according to claim 1,
wherein a dimensional accuracy of the teeth of the tooth crowns for a circumference of 70 mm is smaller than 5 µm.

5. The device according to claim 1,
wherein the tooth crowns are designed as helical toothings, the directions of the teeth at both ends of a roller being either opposed to each other or the same, and opposed to the cooperating teeth of the other roller.

6. The device according to claim 1, wherein over a length that is slightly greater than a width of the foil, a sum of the diameters of the two rollers which cooperate in the embossing operation of the foil is 0.02 to 0.2 smaller than a sum of the diameters of the remaining parts of the rollers.

7. The device according to claim 1, wherein the teeth of the embossing roller for embossing logos are pyramidal with a rectangular or square horizontal projection or conical with a round cross-section, and edges of the pyramidal teeth are arranged either orthogonally to the longitudinal axis of the roller or at an angle of between 1° and 89° thereto.

8. The device according to claim 1, wherein individual teeth of the embossing roller are modified in height or shape in order to produce embossed signs whose appearance varies depending on lighting conditions and a viewing angle.

9. The device according to claim 1, wherein the embossing roller has teeth in locations that are intended for embossing logos only.

10. The device according to claim 1, wherein logos produced by omitting teeth or by teeth modified so as to produce a shadow embossing are present in the logo area, outside the logo area, or a combination thereof.

11. The device according to claim 1, wherein the logo area is surrounded by a satinized environment.

12. The device according to claim 1, wherein the centering elements further include teeth whose extension is smaller in an axial direction than in a circumferential direction, the teeth including a plurality of first valleys and a plurality of second valleys, the first valley being deeper in the circumferential direction than the second valley in the axial direction.

13. The device according to claim 1, wherein a dimensional accuracy for the centering rings is smaller than 20 µm, and a dimensional accuracy of the tooth crowns is smaller than 5 µm.

14. The device according to claim 1, wherein a tooth pitch of the teeth or the toothing is 0.05 mm to 0.4 mm.

* * * * *